(12) United States Patent
Zumsteg et al.

(10) Patent No.: US 10,248,817 B2
(45) Date of Patent: *Apr. 2, 2019

(54) READING RFID TAGS IN DEFINED SPATIAL LOCATIONS

(71) Applicant: HAND HELD PRODUCTS, INC., Fort Mill, SC (US)

(72) Inventors: Philip Zumsteg, Shorewood, MN (US); Huyu Qu, San Jose, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,877

(22) Filed: Jan. 10, 2018

(65) Prior Publication Data
US 2018/0129830 A1 May 10, 2018

Related U.S. Application Data

(63) Continuation of application No. 13/743,956, filed on Jan. 17, 2013, now Pat. No. 9,892,289.

(60) Provisional application No. 61/734,669, filed on Dec. 7, 2012.

(51) Int. Cl.
*G06K 7/00* (2006.01)
*G07G 1/00* (2006.01)
*G06K 7/10* (2006.01)

(52) U.S. Cl.
CPC ....... *G06K 7/0004* (2013.01); *G06K 7/10089* (2013.01); *G06K 7/10356* (2013.01); *G07G 1/009* (2013.01)

(58) Field of Classification Search
None
See application file for complete search history.

(56) References Cited

U.S. PATENT DOCUMENTS

| | | |
|---|---|---|
| 4,583,083 A | 4/1986 | Bogasky |
| 5,457,307 A | 10/1995 | Dumont |
| 7,076,441 B2 | 7/2006 | Hind et al. |
| 7,513,425 B2 | 4/2009 | Chung |
| 7,527,197 B2 | 5/2009 | Murofushi et al. |
| 7,631,808 B2 | 12/2009 | Kundu et al. |
| 7,652,576 B1 | 1/2010 | Crossno et al. |

(Continued)

OTHER PUBLICATIONS

Jan. 3, 2018 Combined Search and Examination Report issued in British Patent Application No. 1710453.0.

*Primary Examiner* — Chico A Foxx
(74) *Attorney, Agent, or Firm* — Oliff PLC; R. Brian Drozd

(57) ABSTRACT

Devices, methods, and software are disclosed for reading RFID tags located in defined spatial locations. In one illustrative embodiment, a system can comprise a processor, a memory, and an RFID reading device including at least one radio frequency (RF) antenna. The system can be configured to read a first plurality of RFID tags attached to items disposed within a first spatial zone and read a second plurality of RFID tags attached to items disposed within a second spatial zone. The system can be further configured to produce a list of identifiers of RFID tags which belong to the second plurality of RFID tags and do not belong to the first plurality of RFID tags. In some embodiments, the system can be further configured, responsive to successfully decoding decodable indicia attached to an item, to match the item to an RFID tag belonging to the list.

19 Claims, 18 Drawing Sheets

(56) References Cited

U.S. PATENT DOCUMENTS

| | | |
|---|---|---|
| 7,667,575 B2 | 2/2010 | Husak et al. |
| 7,753,270 B2 | 7/2010 | Ishida |
| 7,804,407 B2 | 9/2010 | Copeland |
| 7,804,410 B2 | 9/2010 | Copeland |
| 7,804,411 B2 | 9/2010 | Copeland |
| 7,812,729 B2 | 10/2010 | Copeland |
| 7,920,063 B2 | 4/2011 | Ulrich |
| 7,973,641 B1 | 7/2011 | Huang |
| 7,973,661 B2 | 7/2011 | Copeland |
| 7,986,241 B2 | 7/2011 | Copeland et al. |
| 8,056,817 B2 | 11/2011 | Flood |
| 8,094,026 B1 | 1/2012 | Green |
| 8,104,680 B2 | 1/2012 | Kundu et al. |
| 8,149,090 B2 | 4/2012 | Hall et al. |
| 8,164,443 B2 | 4/2012 | Alston et al. |
| 8,179,261 B2 | 5/2012 | Frabasile |
| 8,279,069 B2 | 10/2012 | Sawyer |
| 8,310,366 B2 | 11/2012 | Stern |
| 8,321,302 B2 | 11/2012 | Bauer et al. |
| 8,339,265 B2 | 12/2012 | Campero et al. |
| 8,432,258 B2 | 4/2013 | Wilkinson et al. |
| 8,448,857 B2 | 5/2013 | Davis et al. |
| 8,448,858 B1 | 5/2013 | Kundu et al. |
| 8,456,306 B2 | 6/2013 | Lin et al. |
| 8,494,908 B2 | 7/2013 | Herwig et al. |
| 8,519,823 B2 | 8/2013 | Rinkes |
| 8,570,375 B1 | 10/2013 | Srinivasan et al. |
| 2003/0216969 A1 | 11/2003 | Bauer et al. |
| 2004/0103034 A1 | 5/2004 | Reade et al. |
| 2004/0113791 A1 | 6/2004 | Salim et al. |
| 2005/0061874 A1 | 3/2005 | Mathewson et al. |
| 2006/0170565 A1 | 8/2006 | Husak et al. |
| 2006/0243798 A1 | 11/2006 | Kundu et al. |
| 2007/0119926 A1 | 5/2007 | Sloan et al. |
| 2007/0119932 A1 | 5/2007 | Sugano et al. |
| 2007/0138271 A1 | 6/2007 | Murofushi et al. |
| 2007/0185612 A1 | 8/2007 | Stevens et al. |
| 2007/0257857 A1 | 11/2007 | Marino et al. |
| 2008/0065496 A1 | 3/2008 | Fowler et al. |
| 2008/0084278 A1* | 4/2008 | Iida ................. G06Q 30/02 340/10.41 |
| 2008/0167978 A1 | 7/2008 | Abernethy, Jr. et al. |
| 2008/0226129 A1 | 9/2008 | Kundu et al. |
| 2008/0249883 A1* | 10/2008 | Daily ................. A47F 9/047 705/23 |
| 2008/0266099 A1* | 10/2008 | Daily ................. G06Q 30/06 340/572.1 |
| 2009/0171798 A1 | 7/2009 | Sasaki et al. |
| 2009/0231135 A1 | 9/2009 | Chaves et al. |
| 2009/0307097 A1 | 12/2009 | De Faria |
| 2010/0039284 A1 | 2/2010 | Hall et al. |
| 2010/0059589 A1 | 3/2010 | Goncalves et al. |
| 2010/0060455 A1 | 3/2010 | Frabasile |
| 2010/0140351 A1 | 6/2010 | Trenciansky |
| 2010/0148985 A1 | 6/2010 | Lin et al. |
| 2010/0157051 A1 | 6/2010 | Pankanti |
| 2010/0171617 A1 | 7/2010 | Sano |
| 2010/0193588 A1 | 8/2010 | Cherry |
| 2010/0201488 A1 | 8/2010 | Stern et al. |
| 2010/0259385 A1 | 10/2010 | Alston et al. |
| 2010/0302010 A1 | 12/2010 | Iwahashi |
| 2011/0148625 A1 | 6/2011 | Velusamy |
| 2011/0199211 A1 | 8/2011 | Campero et al. |
| 2011/0304437 A1 | 12/2011 | Beeler et al. |
| 2012/0038456 A1 | 2/2012 | Pikkarainen et al. |
| 2012/0044074 A1 | 2/2012 | Mulla |
| 2012/0075450 A1 | 3/2012 | Ding et al. |
| 2012/0169470 A1 | 7/2012 | Lee |
| 2012/0190386 A1 | 7/2012 | Anderson |
| 2012/0221423 A1 | 8/2012 | Morita |
| 2012/0228240 A1 | 9/2012 | Gentile et al. |
| 2012/0280040 A1 | 11/2012 | Carney et al. |
| 2012/0313759 A1 | 12/2012 | Markwitz et al. |
| 2012/0321146 A1 | 12/2012 | Kundu et al. |
| 2012/0327202 A1 | 12/2012 | Nagamachi |
| 2013/0169413 A1 | 7/2013 | Schuessler |
| 2013/0278425 A1 | 10/2013 | Cunningham et al. |
| 2014/0111311 A1 | 4/2014 | Koch et al. |
| 2014/0176719 A1 | 6/2014 | Migdal et al. |
| 2016/0034981 A1 | 2/2016 | Kluver et al. |
| 2017/0103266 A1 | 4/2017 | Migdal et al. |
| 2017/0249487 A1* | 8/2017 | Shimazaki ......... G06K 7/10356 |

* cited by examiner

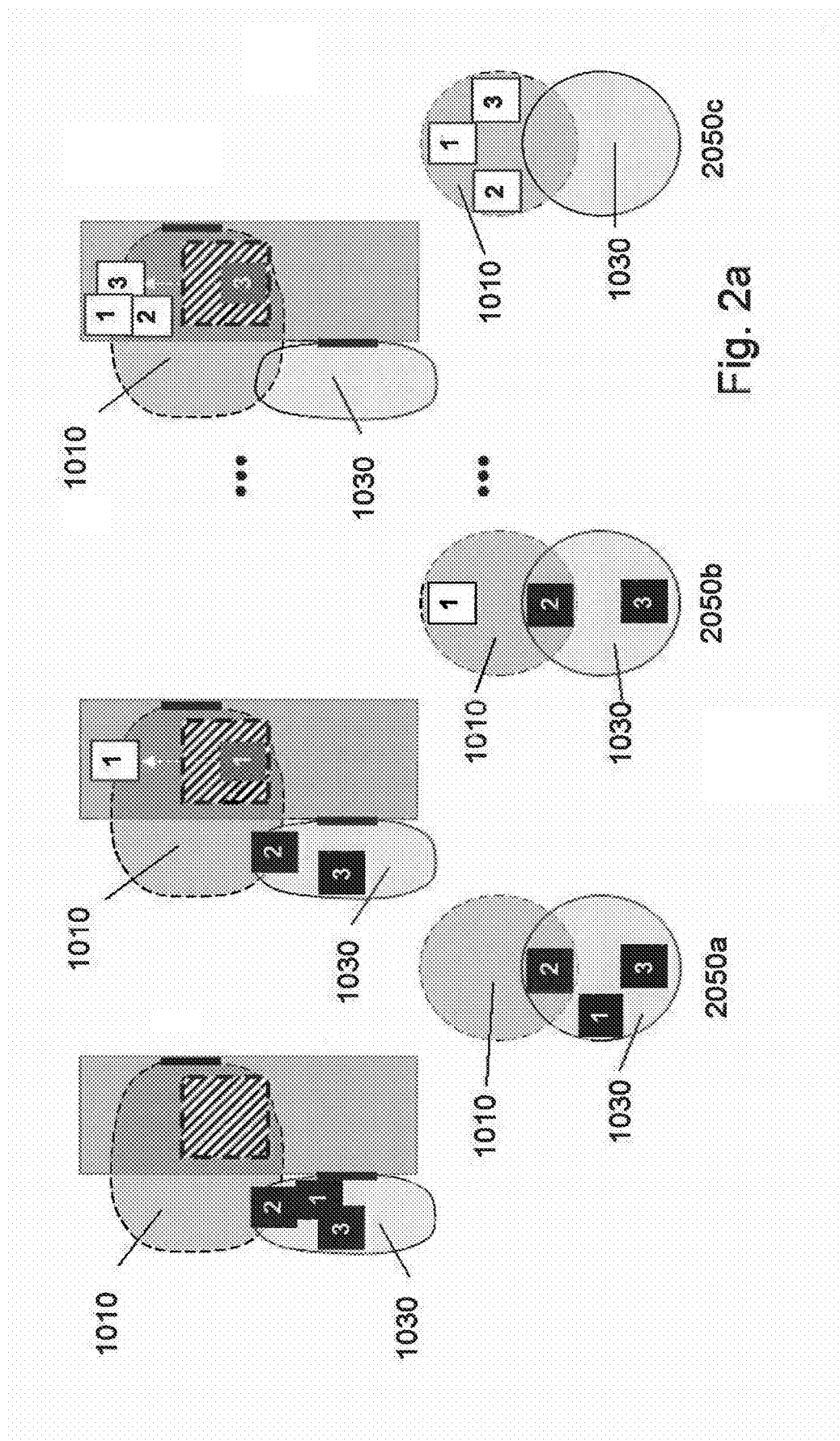

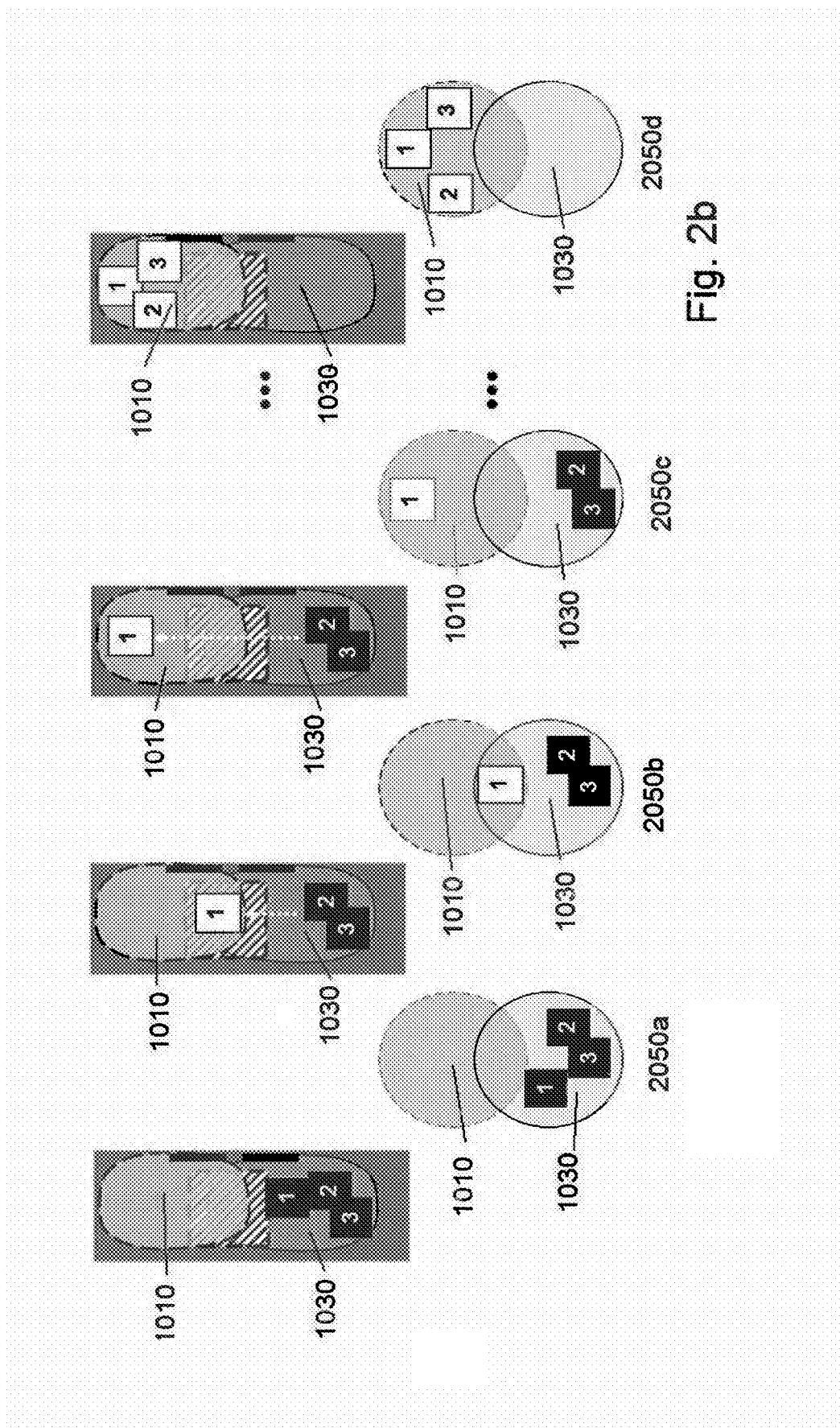

READING RFID TAGS IN DEFINED SPATIAL LOCATIONS

CROSS REFERENCE TO RELATED APPLICATIONS

This is a Continuation of application Ser. No. 13/743,956 filed Jan. 17, 2013, which in which claims the benefit of U.S. Provisional Application No. 61/734,669 filed Dec. 7, 2012. The disclosure of the prior applications are hereby incorporated by reference herein in their entirety.

FIELD OF THE INVENTION

The invention is generally related to digital devices and is specifically related to radio-frequency identification (RFID) reading devices.

BACKGROUND OF THE INVENTION

RFID methods are widely used in a number of applications, including smart cards, item tracking in manufacturing, inventory management in retail, etc. An RFID tag can be attached, e.g., to a retail item. An RFID reading device can be configured to read the memory of an RFID tag attached to a retail item.

The discussion above is merely provided for general background information and is not intended to be used as an aid in determining the scope of the claimed subject matter.

SUMMARY OF THE INVENTION

Systems are disclosed that in various embodiments include devices, methods, and/or software for reading RFID tags located in defined spatial locations. In one illustrative embodiment, there is provided a system comprising a processor, a memory, and an RFID reading device including at least one radio frequency (RF) antenna. The system can be configured to read a first plurality of RFID tags attached to items disposed within a first spatial zone and read a second plurality of RFID tags attached to items disposed within a second spatial zone. The system can be further configured to produce a list of identifiers of RFID tags which belong to the second plurality of RFID tags and do not belong to the first plurality of RFID tags.

In some embodiments, the system can be further configured, responsive to successfully decoding decodable indicia attached to an item, to match the item to an RFID tag belonging to the list.

In some embodiments, the system can further comprise a decodable indicia reading device, and can be further configured, responsive to successfully decoding decodable indicia attached to an item, to match the item to an RFID tag belonging to the list. The system can be further configured to transmit the identifier of the matched RFID tag to an external computer. Alternatively, the system can be further configured to modify a memory of the matched RFID tag.

In some embodiments, the RFID reading device can be equipped with two or more RF antennas. The system can be configured to read the first plurality of RFID tags using the first RF antenna and read the second plurality of RFID tags using the second RF antenna.

In some embodiments, at least one RF antenna can be equipped with a ground plane or a conductive shield spatially oriented according to a spatial location of at least one spatial zone.

In some embodiments, the system can be configured to associate RFID tags with a spatial zone by selecting an antenna from one or more antennas communicatively coupled to the RFID reading device, varying a transmit power of the RFID reading device and/or measuring RFID tag response rates at a given transmit power level.

In some embodiments, the system can be incorporated into a portable device. Alternatively, the system can be incorporated into a point-of-sale (POS) checkout register.

In some embodiments, the first spatial zone and the second spatial zone can intersect by at least one spatial point.

In another illustrative embodiment, there is provided a method of reading RFID tags disposed in defined spatial locations. The method can comprise: reading a first plurality of RFID tags attached to items disposed within a first spatial zone, reading a second plurality of RFID tags attached to items disposed within a second spatial zone, and matching an item to an RFID tag belonging to the second plurality of RFID tags but not to the first plurality of RFID tags.

In some embodiments, the method can further comprise decoding optical decodable indicia attached to the item, preceding the step of matching.

In some embodiments, the method can further comprise transmitting the identifier of the matched RFID tag to an external computer. Alternatively, the method can further comprise modifying the memory of the matched RFID tag.

In another illustrative embodiment, there is provided a method of reading RFID tags disposed in defined spatial locations. The method can comprise: varying a transmit power of an RFID reading device, measuring RFID tag response rates by a plurality of RFID tags at a given transmit power level, associating each RFID tag of the plurality of RFID tags with a spatial zone, and matching an item to an RFID tag belonging to the second plurality of RFID tags but not to the first plurality of RFID tags.

In some embodiments, the method can further comprise decoding optical decodable indicia attached to the item, preceding the step of matching.

In some embodiments, the method can further comprise transmitting the identifier of the matched RFID tag to an external computer. Alternatively, the method can further comprise modifying the memory of the matched RFID tag.

In another illustrative embodiment, there is provided a computer-readable storage medium comprising executable instructions capable of configuring one or more processors for: reading a first plurality of RFID tags attached to items disposed within a first spatial zone, reading a second plurality of RFID tags attached to items disposed within a second spatial zone, decoding optical decodable indicia attached to an item, and matching the item to an RFID tag belonging to the second plurality of RFID tags but not to the first plurality of RFID tags. In some embodiments, the executable instructions can be further capable of configuring one or more processors for modifying the memory of the matched RFID tag.

In some embodiments, the executable instructions can be further capable of configuring one or more processors for transmitting the identifier of the matched RFID tag to an external computer.

In some embodiments, the executable instructions can be further capable of configuring one or more processors for modifying a memory of the matched RFID tag.

In some embodiments, the executable instructions can be further capable of configuring one or more processors so that the step of reading the first plurality of RFID tags can be performed using a first RF antenna with a first selected transmit power level, the step of reading the second plurality of RFID tags can be performed using a second RF antenna with a second selected transmit power level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 2a-2e schematically illustrate several use cases of reading RFID tags located within defined spatial zones.

DETAILED DESCRIPTION OF THE INVENTION

Figure 1:
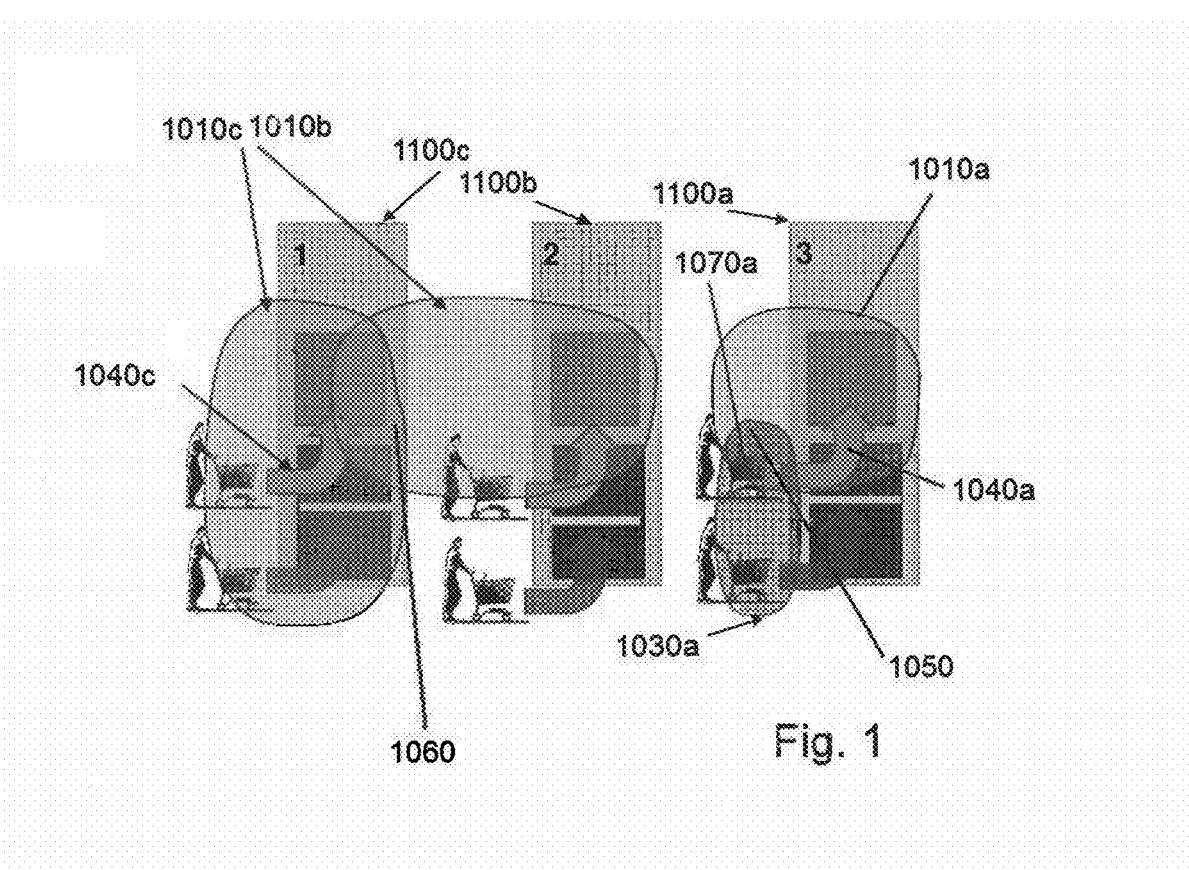
FIG. 1 schematically illustrates a use case of reading RFID tags located within defined spatial zones.

Retail item tracking can be implemented by placing an RFID tag on each retail item. An RFID reading device can transmit information to a passive RFID tag by modulating an RF signal. The RFID tag can respond by modulating the reflection coefficient of its antenna, thus backscattering an information signal to the RFID reading device. Thus, the RFID reading device can read and/or modify memory of RFID tags. Each RFID tag can store the tag identifier in its memory. An RFID tag attached to a retail item can further store in its memory a product code of the item (e.g., an EPC code) of the item and/or at least one alphanumeric string identifying the item.

RFID tags can be used in retail facilities to prevent stock "shrinkage" due to unauthorized removal of retail items which have not been properly purchased. Improved security can be achieved by installing point-of-exit RFID reading devices which would constantly read RFID tags located within their respective RFID reading ranges. As part of a purchase transaction with respect to a retail item, the memory of the RFID tag attached to the item can be modified indicating that the item has been paid for, and the point-of-exit system can be programmed to only trigger an alarm responsive to detecting an RFID tag having the Paid attribute value of False.

Alternatively, the point-of-exit RFID reading devices can constantly read RFID tags located within their respective RFID reading ranges and compare the individual tag identifiers against a list of tags attached to properly purchased retail items. As part of a purchase transaction with respect to a retail item, the checkout system can be programmed to add to the list of "cleared" tags the identifier of the RFID tag attached to the item, and the point-of-exit system can be programmed to only trigger an alarm responsive to detecting an RFID tag identifier not in the "cleared" list.

A considerable drawback of this approach is an additional manual work operation for the checkout operator who, due to inherently poor spatial selectivity of RFID read/write operations, would have to physically isolate the item being purchased from other similar items in order to activate an RFID writing operation to modify the memory of the RFID tag attached the item. Should the POS terminal be capable of matching a particular RFID tag to a bar code label which has just been scanned, the operations of modifying the RFID tag memory and/or adding RFID tag identifier to the "cleared" list could be fully automated, thus eliminating the manual operation of physically isolating the item and hence significantly increasing the efficiency of the checkout operations.

Assuming that a product code is encoded in both bar code (e.g., UPC) and RFID tag (e.g., EPC) attached to a retail item, the matching of an RFID tag to a bar code being scanned can in one scenario be accomplished by compiling a list of RFID tags present within a spatial zone (e.g., "downstream" from the bar code scanner) and identifying an RFID tag with the product code equal to that of the scanned bar code. Due to the above mentioned inherently poor spatial selectivity of RFID read operations, an additional step of removing the RFID tags which are presumed to be extraneous to the purchase transaction currently being effectuated (e.g., RFID tags attached to the items disposed "upstream" from the bar code scanner, including the customer's shopping cart) from the compiled list of RFID tags before performing the product code matching. In a more complex scenario, the system can implement a state machine tracking movements of items with RFID tags between two or more defined spatial zones.

Hence, in one illustrative embodiment, the RFID reading device installed on the checkout line should be capable of reading RFID tags within at least two spatial zones including a POS transaction zone located "downstream" from the checkout bar code scanner and an "exclusion" zone located "upstream" from the checkout bar code scanner. The above described spatial selectivity in RFID reading operations can be accomplished by equipping the checkout RFID reading device with at least two radio frequency (RF) antennas spatially oriented according to the spatial configurations of the two or more spatial zones, as described in details herein infra. In a further aspect, the checkout system can be programmed to track movements of items with RFID tags between two or more defined spatial zones, as described in details herein infra.

In another illustrative embodiment, the above described spatial selectivity in RFID reading operations can be accomplished by several methods, used individually or in combination, including but not limited to: one or more antennas, antenna design, antenna placement and orientation, design and placement of conductive shielding in proximity to an antenna, varying the transmit power of the RFID reading device for each antenna and varying the transmit power of the RFID reading device for each antenna and measuring RFID tag response rate variations, as described in details herein infra.

Hence, in one illustrative embodiment, there is provided a system comprising a processor, a memory, and an RFID reading device including at least one RF antenna. Generally speaking, the RFID reading device can read RFID tags from a range of distances and various antenna orientations with respect to an RFID tag being read.

The system can read the RFID tags attached to the retail items disposed within a defined spatial zone ("POS zone"), as schematically illustrated by FIG. 1. The POS zone 1010a-1010c can be located within a checkout counter 1100a-1100c; in some embodiments, the POS zone can be located within a defined distance from the checkout register (not shown in FIG. 1). The system can read the RFID tags attached to the retail items disposed within the "exclusion zone" 1030a which can be located "upstream", with respect to POS zone 1010a, along the merchandise flow path 1040a. In some embodiments, the POS zone and the exclusion zone can intersect by one or more spatial points 1050. In some embodiments, two POS zones 1010a and 1010b related to two spatially neighboring checkout isles can intersect by one or more spatial points 1060.

The system can produce a list of identifiers of RFID tags attached to items located within the POS zone. In some embodiments, the system can remove from the compiled list the RFID tags attached to items located within the exclusion zone. Responsive to successfully decoding a bar code attached to an item, the system can match the item to an RFID tag belonging to the list. In some embodiments, the system can add the identifier of the matched RFID tag to the list of "cleared" tags to be allowed to leave the store by the point-of-exit system. In some embodiments, the system can transmit the identifier of the matched RFID tag to an external computer, e.g., for adding the tag identifier to the list of "cleared" tags to be allowed to leave the store by the point-of-exit system. Alternatively, the system can modify the memory of the matched RFID tag, e.g., by setting the value of the Paid attribute to True.

Figure 2C:
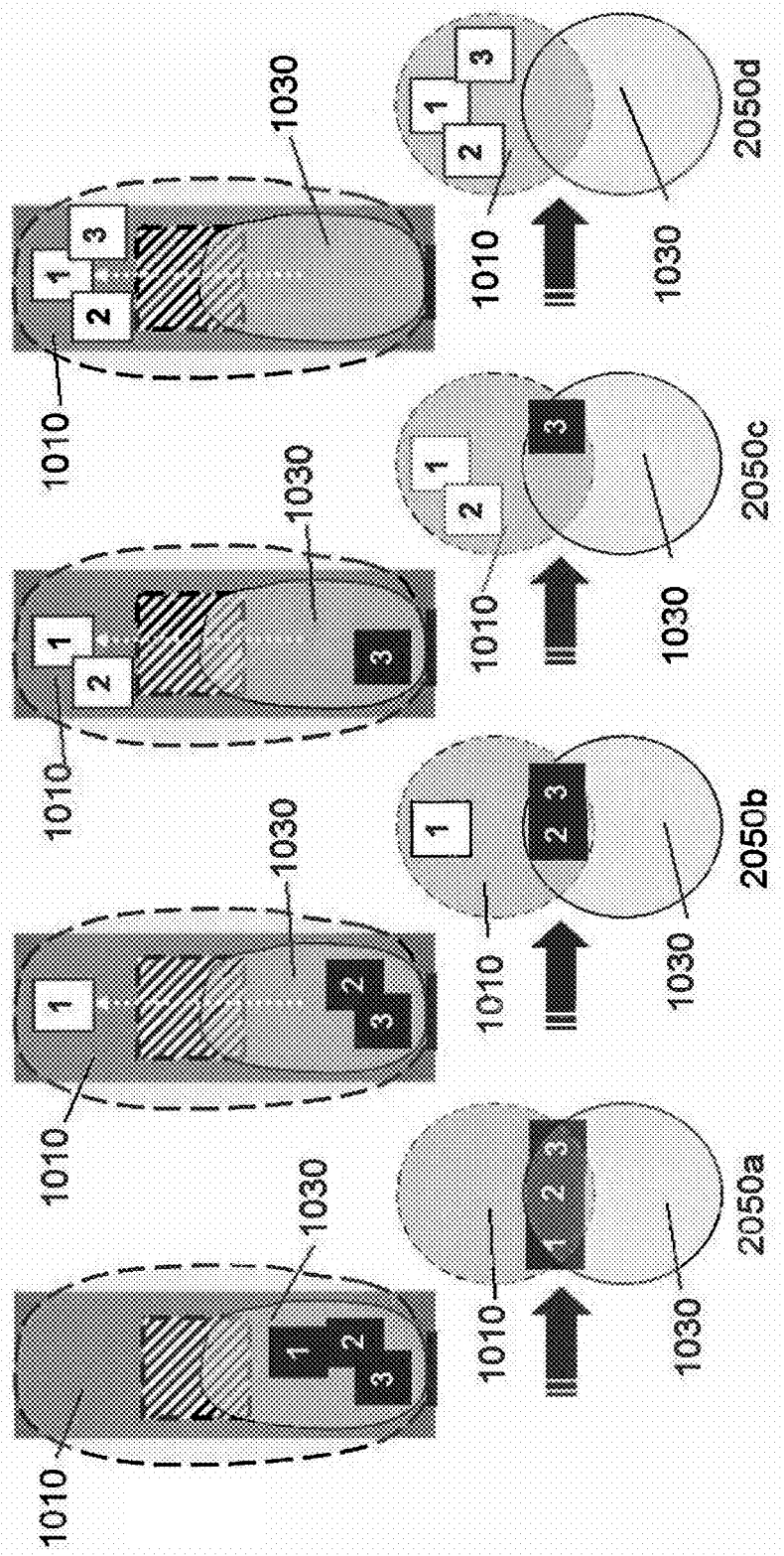

In illustrative embodiments, schematically illustrated by FIGS. 2a-2c, the system can be configured to read the RFID tags attached to the retail items disposed within spatial zones 1010 ("POS zone") and 1030 ("exclusion zone"). The system can be further configured to track movements of items with RFID tags between the defined spatial zones, as schematically illustrated by diagrams 2050a-2050c showing the flow of items 1 and 3 which are initially (diagram 2050a) located in the exclusion zone 1030, and item 2 which is initially located within the intersection of POS 1010 and exclusion 1030 zones; then, as shown by diagram 2050b, the system registers the movement of item 1 into the POS zone 1010 as the item 1 is passed through the checkout line, and the movement of item 2 into the intersection of POS 1010 and exclusion 1030 zones; finally, as shown by diagram 2050c, the system registers the movement of remaining items 2 and 3 into the POS zone 1010, as items 2 and 3 are passed through the checkout line.

Figure 2D:
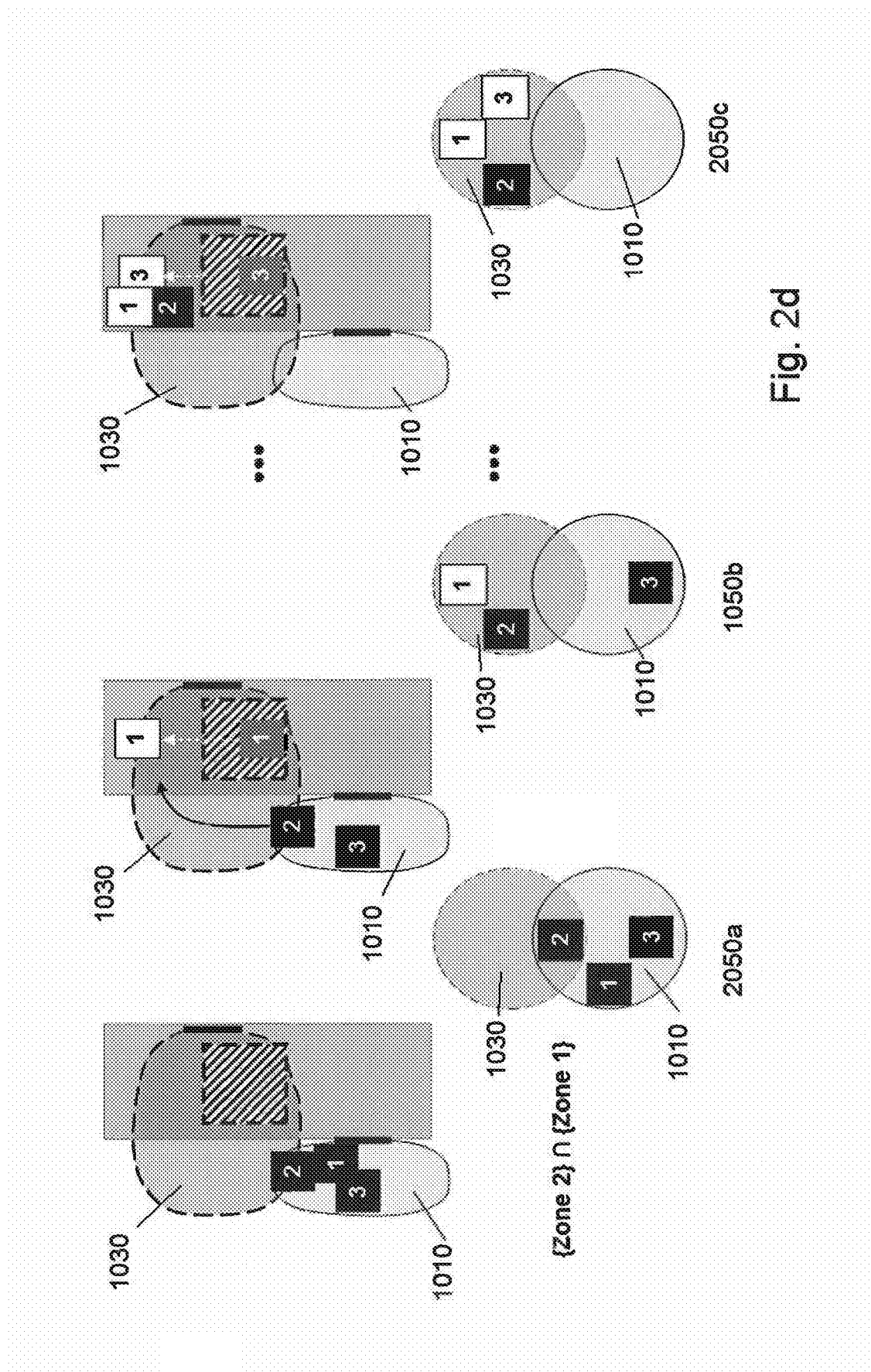

In one example, schematically illustrated by FIG. 2d, responsive to detecting an item having been physically transferred from "exclusion zone" 1030 to "POS zone" 1010 without being scanned by the checkout bar code reader, the system can alert the POS operator (e.g., by emitting an audible alarm and/or displaying a warning message). Responsive to detecting the item which apparently has not been registered in a retail purchase transaction, the system will not enter the tag identifier of the RFID tag attached to the item to the "cleared" list, and thus even if the POS operator fails to take corrective actions after having been alerted by the warning message, an alarm will be triggered by the point-of-exit system upon detecting an item bearing an RFID tag with an identifier missing from the "cleared" tags list.

Figure 2E:
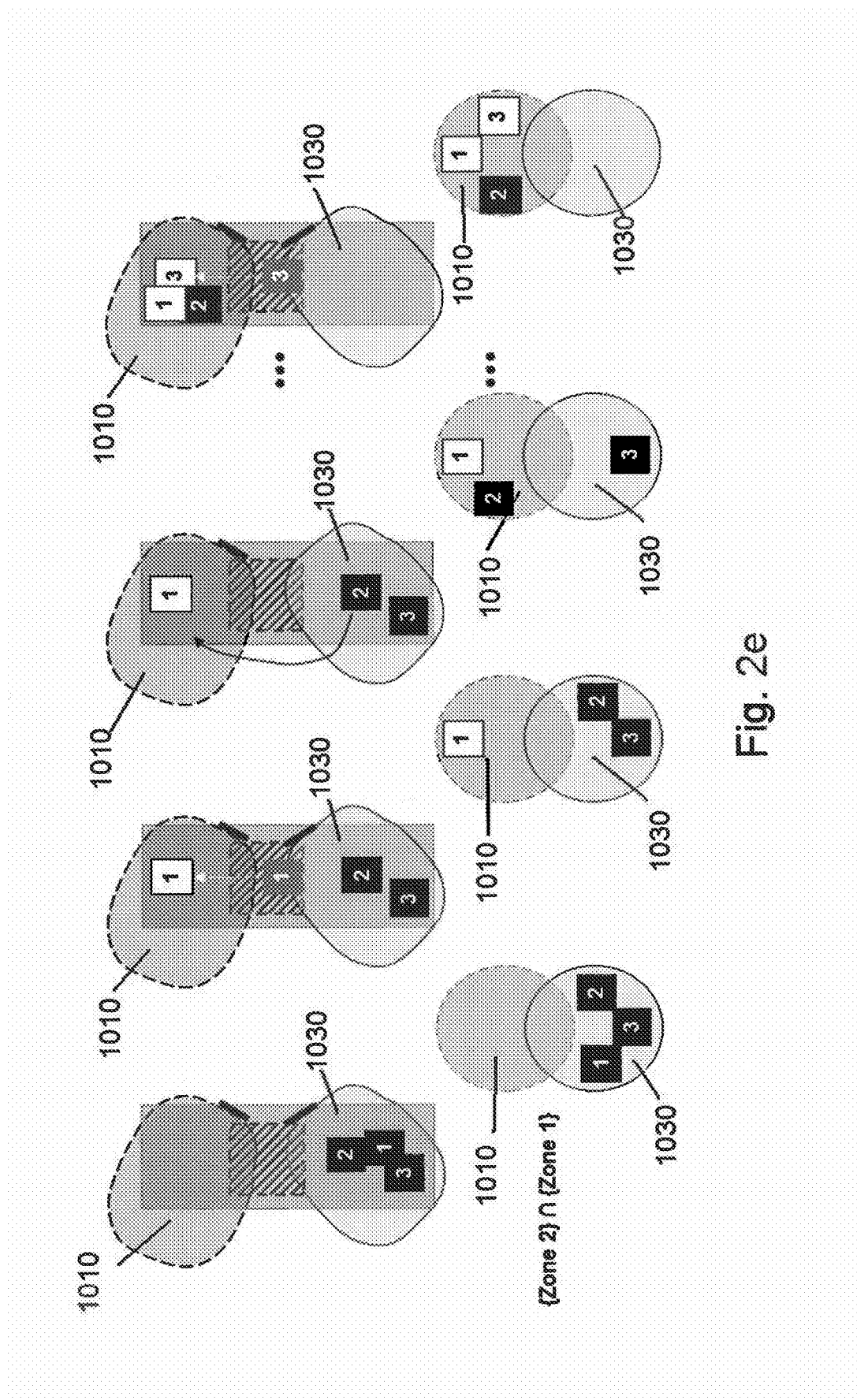

It should be noted that the illustrative spatial configurations of POS and exclusion zones illustrated by FIGS. 1 and 2a-2e are not limiting for the purposes of this disclosure: while in FIGS. 1 and 2a the projection onto a horizontal plane of each of POS zone and exclusion zone has an elongated shape with the longitudinal axes of the two zones being substantially mutually orthogonal, other spatial configurations of POS and exclusion zones are within the scope of this disclosure. For example, FIG. 2b illustrates POS zone 1010 and exclusion zone 1030 each having a horizontal plane projection having an elongated shape with the longitudinal axes of the two zones being substantially parallel or even coinciding. Furthermore, while FIGS. 1 and 2a-2b illustrate the POS zone and exclusion zone having a non-empty intersection, FIG. 2c illustrates another possible spatial configuration of the two zones wherein exclusion zone 1030 is fully contained within the POS zone 1010. FIG. 2e illustrates POS zone 1010 and exclusion zone 1030 having an empty intersection.

In another aspect, to further improve the reliability of scanning operations and the checkout operator experience, the system described herein can be configured to emit audible signals (e.g., beeps) to indicate an occurrence of a defined event, thus providing an audible feedback to the checkout operator. In one illustrative embodiment, the system can be configured to emit an audible signal of a first type every time a bar code has been successfully decoded, emit an audible signal of a second type when a matching RFID tag has been successfully identified, an audible signal of a third type when a bar code has been successfully decoded and the matching RFID tag has not been identified.

Various embodiments of the system described herein can be used in numerous applications, including but not limited to item tracking in manufacturing, storage, and retail, real-time inventory control systems, etc.

Figure 3:
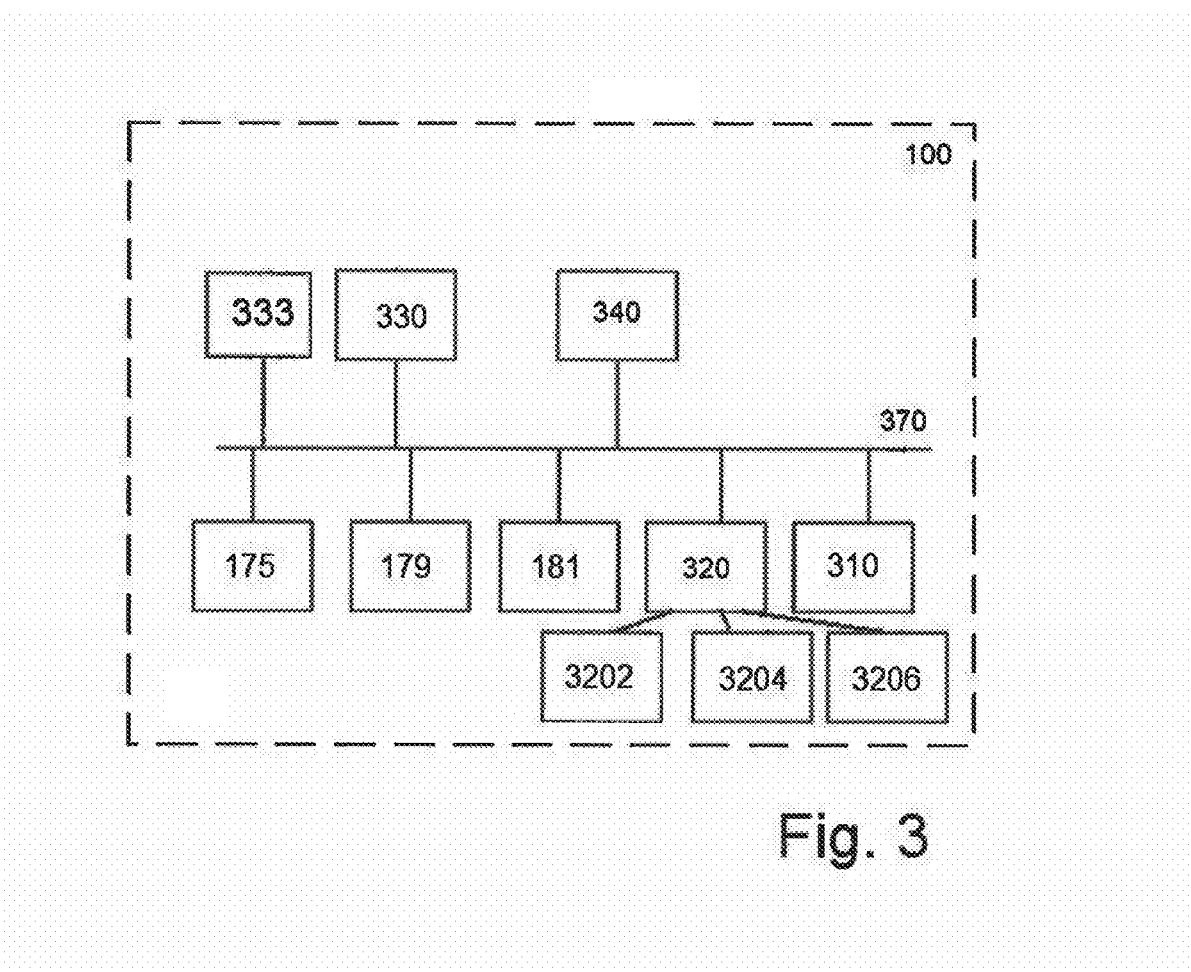
FIG. 3 schematically illustrates a component-level diagram of one embodiment of the system described herein.

Component-level diagram of one embodiment of the system described herein is now being described with references to FIG. 3. System 100 can comprise at least one processor 310 and a memory 320, both coupled to the system bus 370. Processor 310 can be provided by a general purpose microprocessor or by a specialized microprocessor (e.g., an ASIC). In one embodiment, system 100 can comprise a single processor which can be referred to as a central processing unit (CPU). In another embodiment, system 100 can comprise two or more processors, for example, a CPU providing some or most of the system functionality and a specialized microprocessor performing some specific functionality. A skilled artisan would appreciate the fact that other schemes of processing tasks distribution among two or more processors are within the scope of this disclosure.

Memory 320 can include RAM 3202, a nonvolatile memory such as EPROM 3204, a memory storage device 3206, and any of a variety of other types of memory components, in various embodiments. Memory storage device 3206 may illustratively be or include a flash memory, a hard disc drive, any type of RAM, EPROM, EEPROM, DVD-ROM, CD-ROM, or other type of ROM, optical disc, magnetic disc, magnetic cassette, magnetic tape, or any other type of volatile or non-volatile or removable or non-removable memory or data storage components, in various embodiments. Processor 310 can be configured to read executable instructions from memory 320, including RAM 3202, a nonvolatile memory such as EPROM 3204, a memory storage device 3206.

System 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family.

System 100 can further comprise an optical indicia reading device (e.g., bar code reading device) 330. In one embodiment, the optical indicia reading device 330 can be configured to capture an image containing optical indicia and output raw message data containing the encoded message. Alternatively, the optical indicia reading device 330 can be configured to decode optical indicia and output decoded message data corresponding to the encoded message. As used herein, "message" is intended to denote a bit sequence or a character string comprising alphanumeric and/or non-alphanumeric characters. An encoded message can be used to convey information, such as identification of the source and the model of a retail item, for example, in an UPC code.

System 100 can further comprise an RFID reading device 333. In one embodiment, the RFID reading device 333 can be configured to read a memory of an RFID tag containing an encoded message and to output raw message data containing the encoded message. In another embodiment, the RFID reading device 333 can be configured to read a memory of an RFID tag containing an encoded message and to output decoded message data corresponding to the encoded message.

In one embodiment, system 100 can further comprise a graphical user interface including a display adapter 175 and a keyboard 179. In one embodiment, system 100 can further comprise an audio output device, e.g., a speaker 181.

As noted herein supra, the system 100 can be configured to distinguish RFID tags located in at least two spatial zones (e.g., a POS zone and an exclusion zone). In a use case scenario schematically illustrated by FIG. 1, a shopping cart can enter a POS checkout aisle 1100a. RFID reading device 333 can read and store in memory 320 a list of all RFID tags located in the exclusion zone 1030a. The POS terminal operator can initiate a new purchase transaction with respect to the items in the shopping cart 1070a nearest to the POS terminal. As the POS terminal operator moves each item from the cart through the bar code reader area, the system 100, responsive to successfully decoding a bar code, can trigger the RFID reading device to read all the RFID tags located in the POS zone 1010a and create a list of these tags in the POS zone. System 100 can, by comparing the plurality of RFID tags located in the exclusion zone from the plurality of RFID tags located in the POS zone, identify one or more RFID tags which were moved from the exclusion zone to the POS zone.

An RFID tag can store in its memory a product code of the item of the item and/or at least one alphanumeric string uniquely identifying the item (e.g., an EPC code). Hence, system 100 can select, among the identified one or more RFID tags in the POS zone tag list, the RFID tag having a product code equal to that encoded in the last successfully decoded bar code. System 100 can then modify the memory of the matched RFID tag to indicate that the retail item has been paid for, or enter the RFID tag in a "cleared" list.

As noted herein supra, in some embodiments, the spatial selectivity of RFID reading device 333 can be achieved by equipping RFID reading device 333 with at least two radio frequency (RF) antennas. The antennas can be spatially oriented according to the spatial configurations of the two spatial zones (POS zone and exclusion zone) in order to achieve the spatial selectivity in RFID reading operations.

In some embodiments, the spatial selectivity of RFID reading device 333 can be achieved by varying the transmit power of the RFID reading device used with each antenna and/or measuring RFID tag response rate variations. In some embodiments, the spatial selectivity of RFID reading device 333 can be achieved by providing one or more conductive shields and/or ground planes within the spatial area surrounding the antenna of the RFID reading device 333, so that the respective antenna would cover the desired spatial zone (e.g., POS zone or exclusion zone)

Figure 4A:
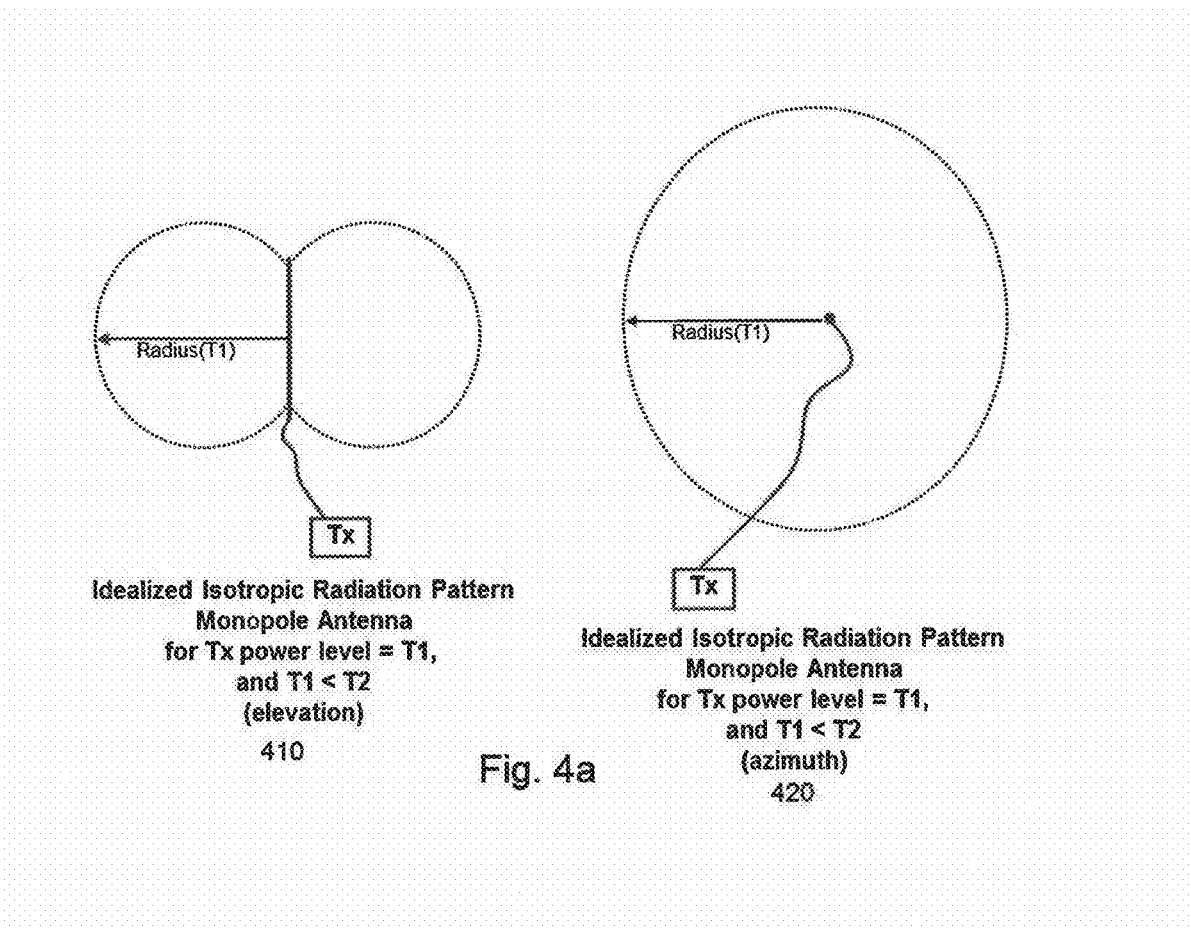
FIG. 4a-4e schematically illustrate idealized isotropic radiation patterns of monopole antennas.
Figure 4B:
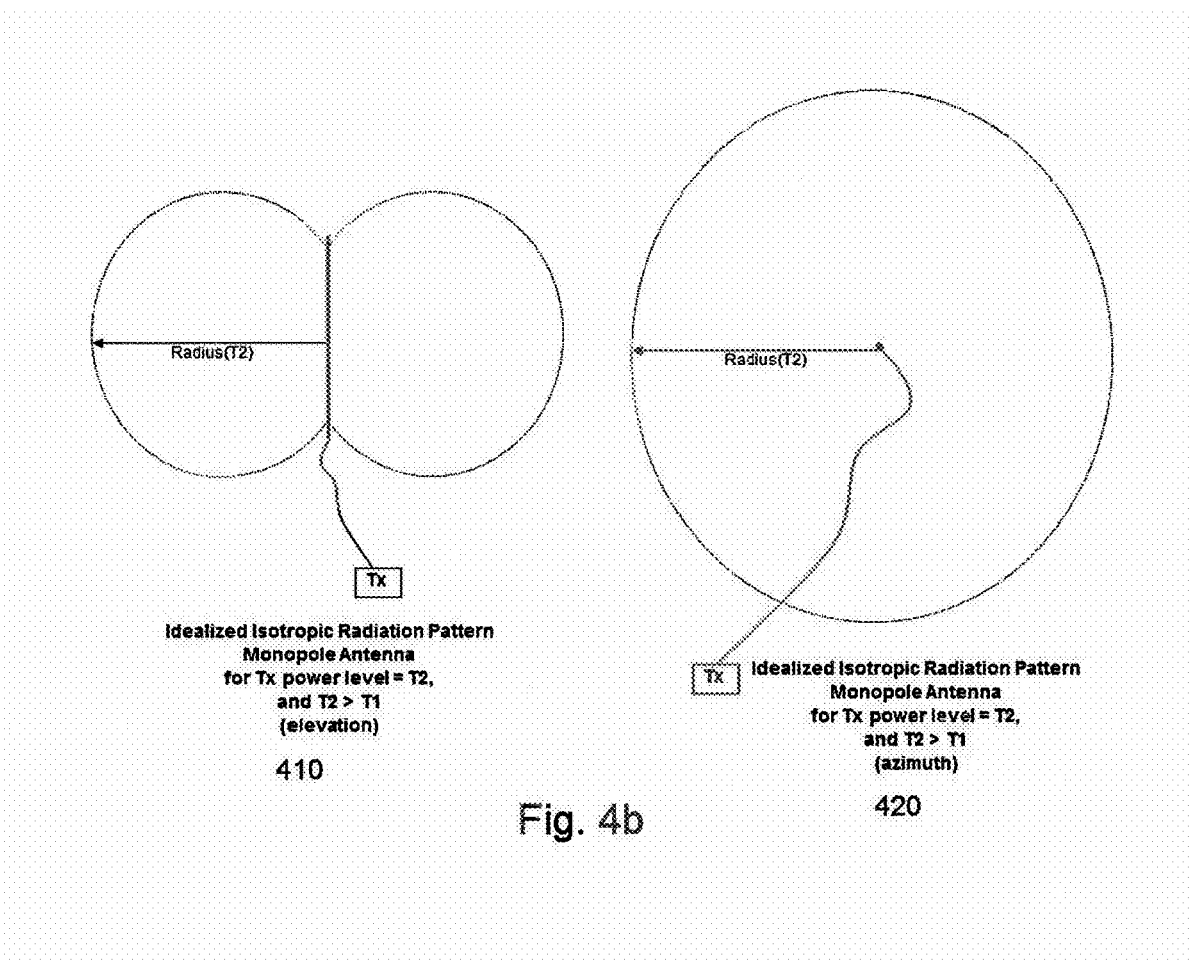

FIG. 4a schematically illustrates elevation view 410 and azimuth view 420 of an idealized isotropic radiation pattern with radius (T1) of a monopole antenna having the transmit power level of T1 . FIG. 4b schematically illustrates elevation view 410 and azimuth view 420 of an idealized isotropic radiation pattern with radius (T2) of a monopole antenna having the transmit power level of T2 , such that T2 >T1.

Since a passive RFID tag needs to convert and accumulate some RF energy in order to be able to respond to an RFID reader query, a finite time period is required during which the RFID reader is transmitting a query and the RFID tag is converting and accumulating energy to use for responding to the RFID reader. The duration of the RFID reader query signal can be long enough to allow the RFID tag to transmit one or more responses before expending the accumulated energy. The rate of RFID tag responses is a function of the rate at which energy is converted and accumulated by the RFID tag and the rate of energy expenditure during RFID tag response periods, which in turn is determined by the RF field strength within the spatial proximity of the tag.

Figure 5A:
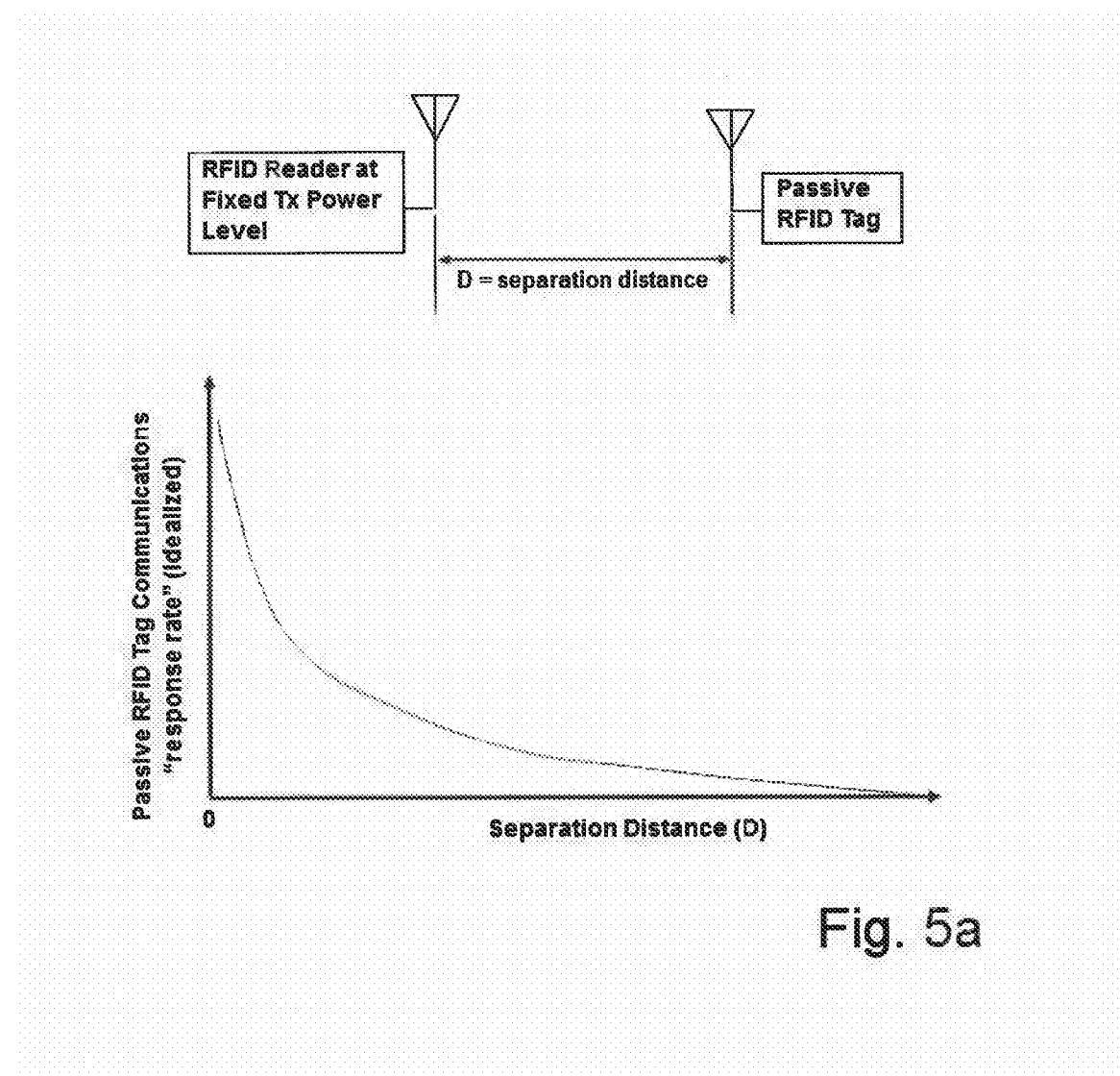
FIGS. 5a-5d schematically plot the RFID tag response rate as a function of distance to the RFID reader and RFID reader transmit power level in an isotropic and anisotropic RF field propagation environment.
Figure 5B:
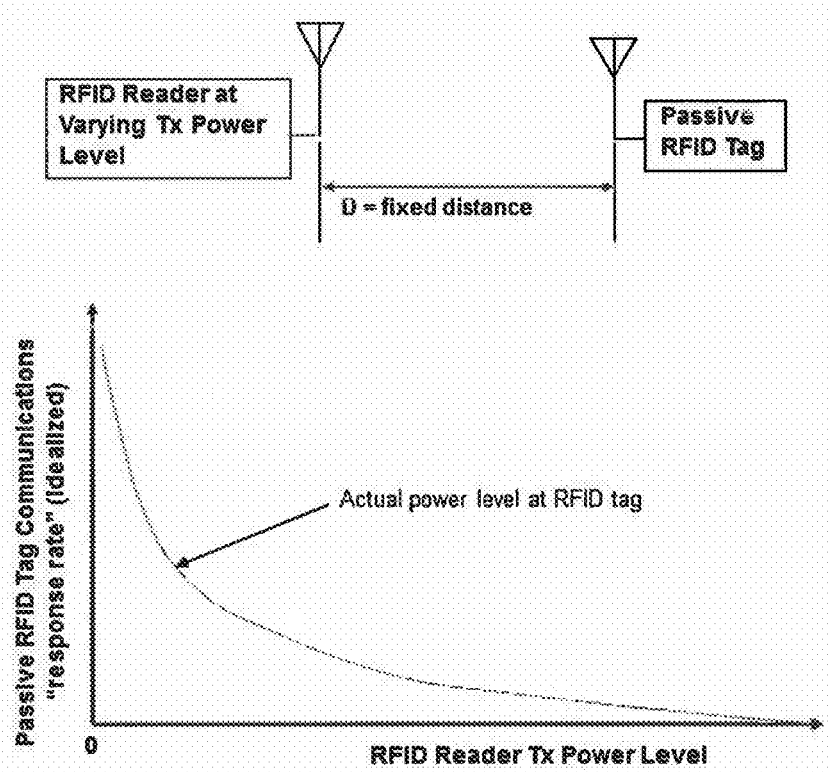

Since in an isotropic propagation environment the RF field strength at a point directly depends upon the distance to the transmitting antenna, the RFID tag response rate at a given RFID reader transmit power level is inversely proportional to the distance between the RFID tag and each antenna driven by the RFID reading device, as schematically illustrated by FIG. 5a. On the other hand, the RFID tag response rate at a given distance to each RFID reader antenna will be inversely proportional to the RFID reader transmit power level used with each antenna, as schematically illustrated by FIG. 5b. It should be noted that while the RFID reader antenna radiation pattern in the examples described herein is assumed to be isotropic, unless specified otherwise, however, antenna radiation patterns of one or more transmitting antennas of system 100 can intentionally be made anisotropic. In some embodiments, the antenna radiation pattern can follow a "flashlight" paradigm, by analogizing an RFID reader to a flashlight which can be pointed by a user in the direction of interest to the user. Hence, for an RFID reader antenna having anisotropic radiation pattern and transmitting in an isotropic propagation environment, the RFID tag response rate can be inversely proportional to the effective radiated power (ERP) of the RFID reader antenna, with a multiplier depending on the antenna design, as well as the azimuth and elevation of the RFID reader antenna relative to the RFID tag antenna. For example, when the primary lobe of the radiation pattern of the RFID reader antenna is "pointed" at the RFID tag, the multiplier is larger as compared to a scenario in which the RFID tag is disposed at some angle away from the direction "pointed to" by the primary lobe of the radiation pattern of the RFID reader antenna.

Hence, in some embodiments, system 100 can be configured to distinguish distances between an RFID reader and two or more RFID tags by varying the RFID reader transmit power level and observing RFID tag response rates at a given transmit power level. In some embodiments, system 100 can be configured to distinguish distances between an RFID reader and two or more RFID tags by varying the RFID reader transmit power and observing response rate variations in response to the changing RFID reader transmit power level. In some embodiments, varying the RFID reader transmit power level can be performed by starting at a selected first RF transmit power level and incrementally increasing the RF transmit power level to a selected second RF transmit power level, where the first and the second transmit power levels represent the maximum possible variation in RF transmit power level or a subset of the possible RF transmit power level range. Alternatively, varying the RFID reader transmit power level can be performed by starting at a selected first RF transmit power level and incrementally decreasing the RF transmit power level to a selected second RF transmit power level, where the first and the second transmit power levels represent the maximum possible variation in RF transmit power level or a subset of the possible RF transmit power level range. The incremental varying can be started or stopped in response to the rate of response of zero or more RFID tags.

Figure 5C:
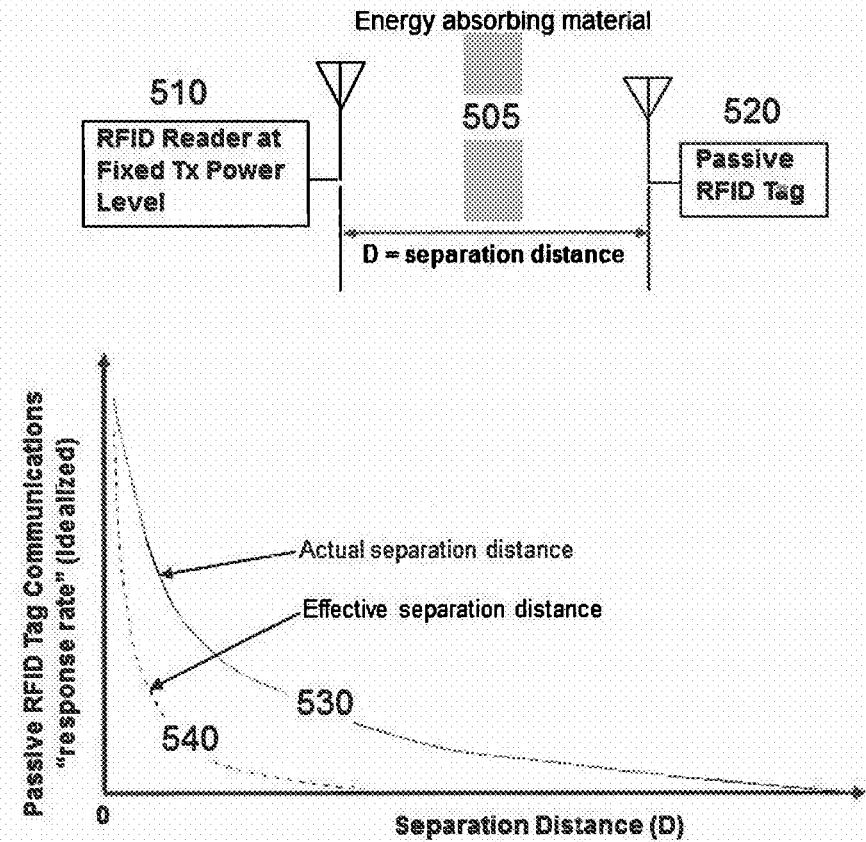

In a further aspect, the RF signal strength can also be affected by attenuation of the RF signal as it passes through various RF energy absorbing objects (e.g., walls). As schematically illustrated by FIG. 5c, the presence of an RF energy absorbing object 505 between the RFID reader 510 and the RFID tag 520 can be viewed as the equivalent of increasing the separation distance between them in an isotropic RF energy propagation environment. In FIG. 5c, plot 530 shows an actual distance between RFID reader 510 and RFID tag 520, while plot 540 shows an "effective separation distance" determined by the RFID tag 530 response rate in a situation when both RFID reader 510 and RFID tag 520 operate in an isotropic RF energy propagation environment (i.e., in the absence of the RF energy absorbing object).

Figure 5D:
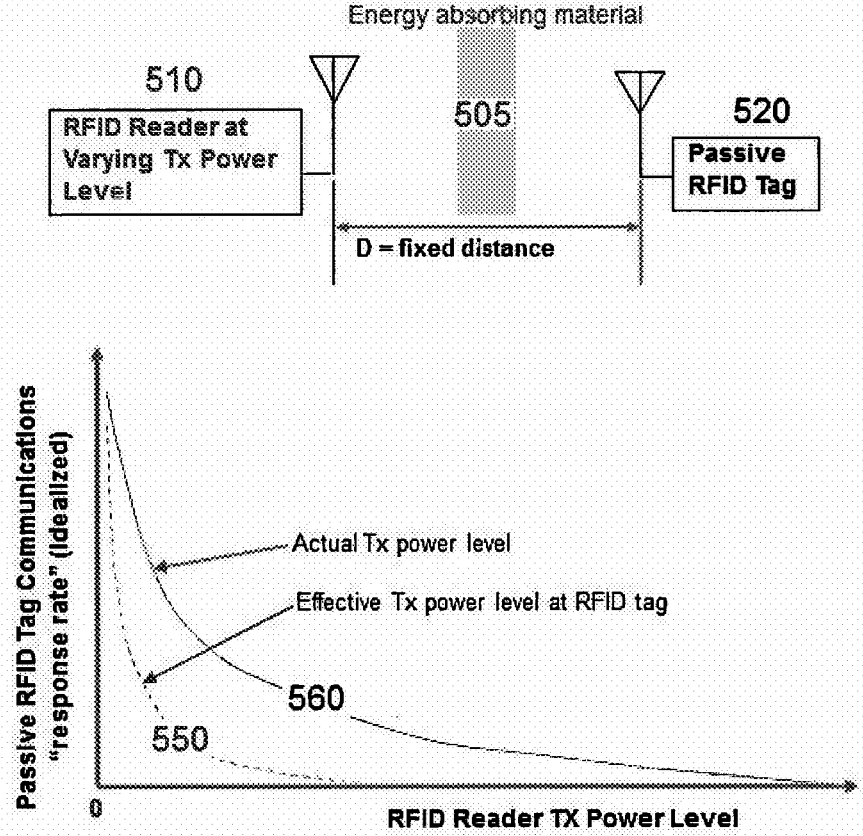

Alternatively, as schematically illustrated by FIG. 5d, the presence of an RF energy absorbing object 505 between the RFID reader 510 and the RFID tag 520 can be viewed as reducing the effective RFID transmit power level sensed by RFID tag 520 (plot 550) as compared to the actual RFID transmit power level measured at the RFID reader (plot 560).

Thus, in some embodiments, system 100 can be configured to distinguish relative distances between RFID reading device 333 and two or more RFID tags, and hence associate each of the RFID tags with two or more spatial zones (e.g., POS zone and exclusion zone) by varying the transmit power level of RFID reading device 333 and measuring RFID tag response time intervals by each RFID tag at one or more given transmit power levels.

Figure 4C:
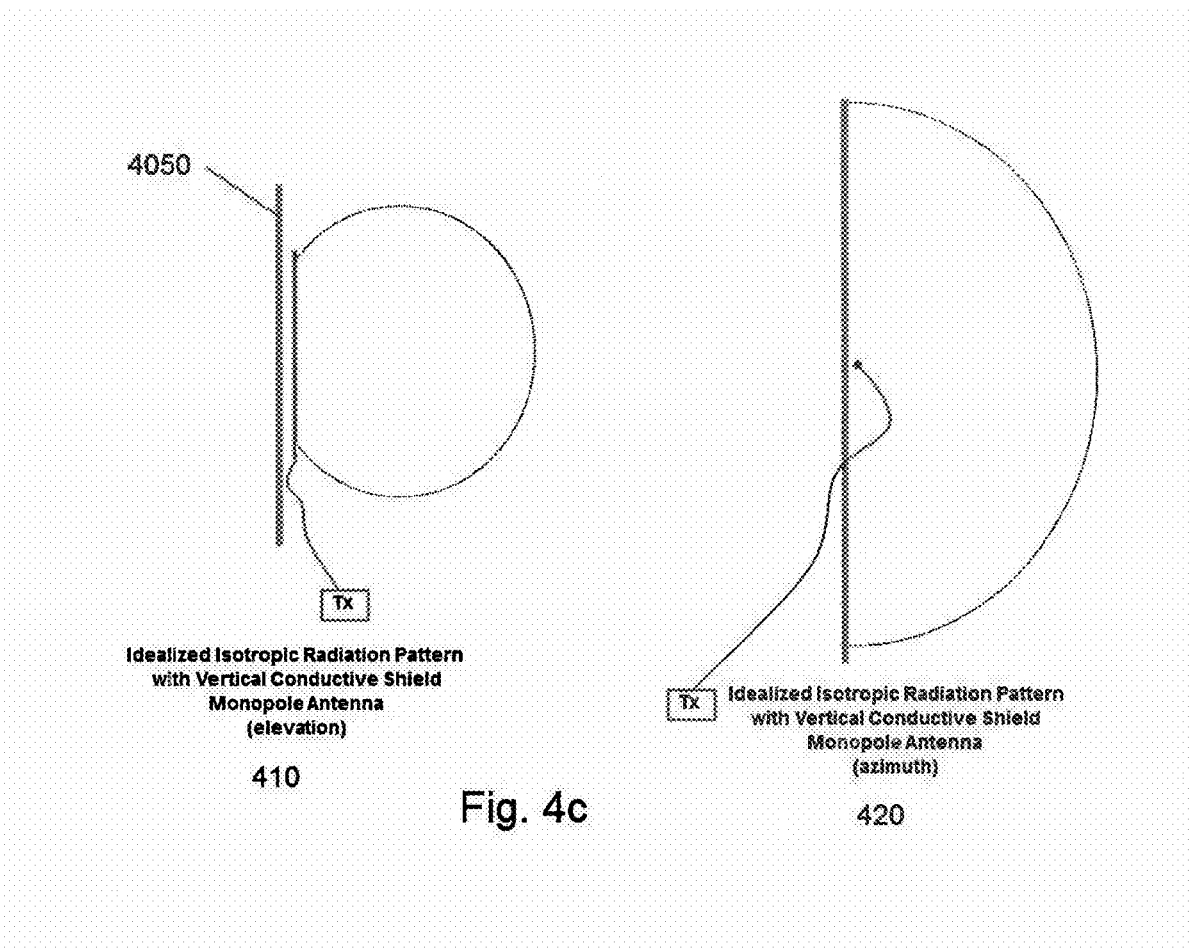
Figure 4D:
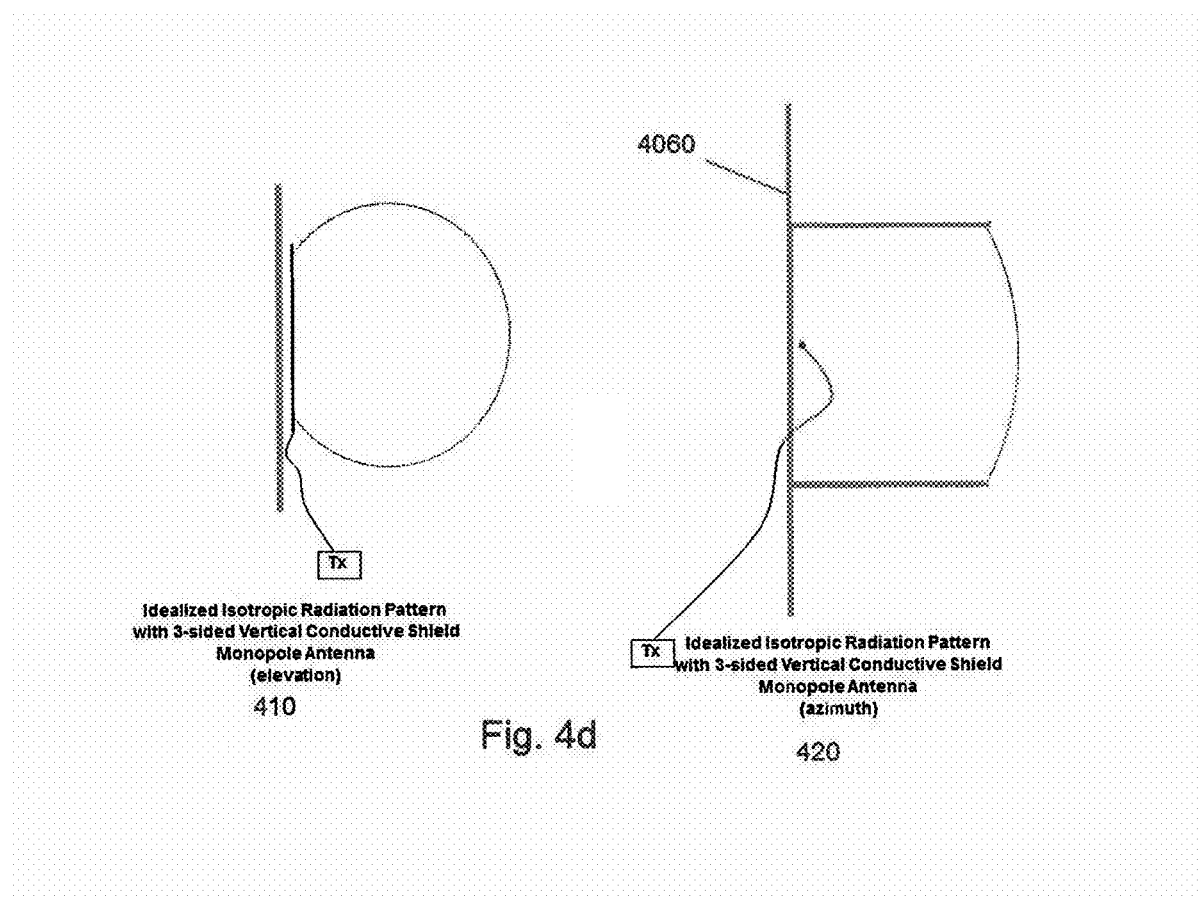
Figure 4E:
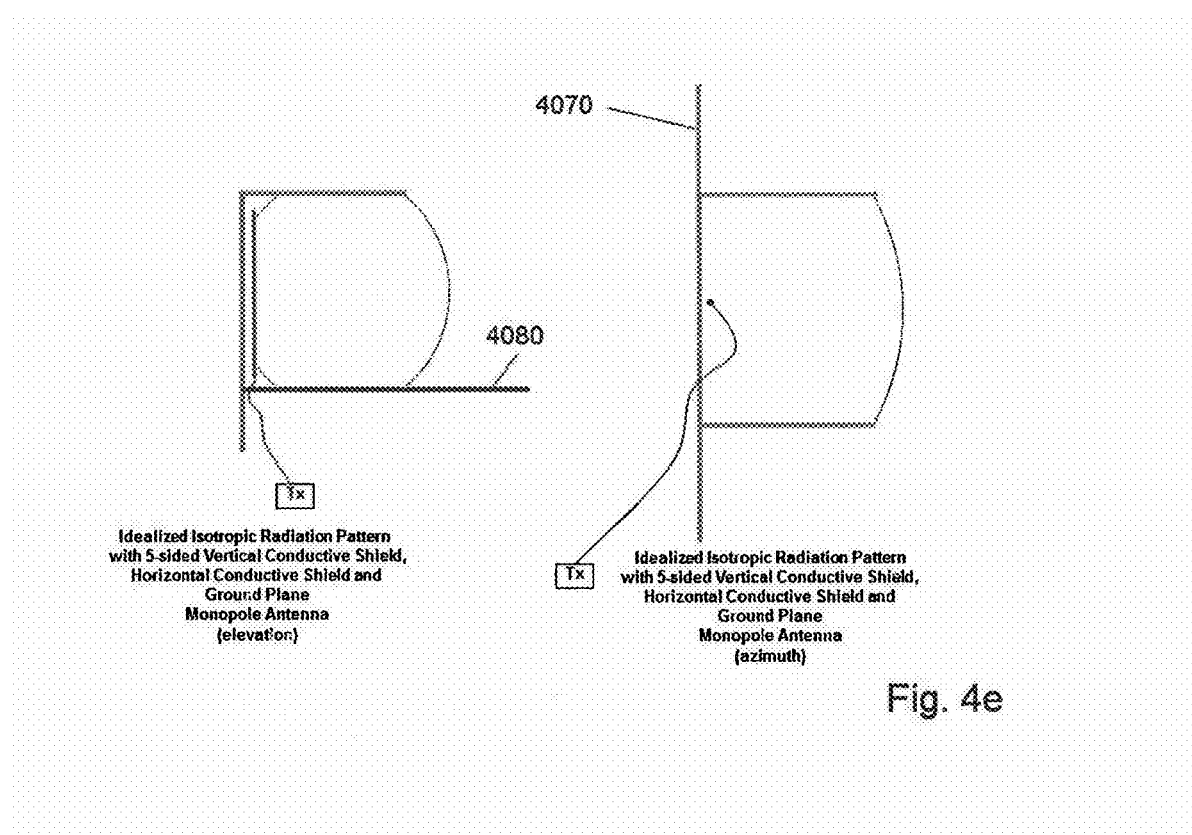

Alternatively, the RF signal radiation pattern of each antenna can be manipulated by providing one or more conductive shields and/or ground planes within the spatial area surrounding the antenna, so that the respective antenna would cover the desired spatial zone (e.g., POS zone or exclusion zone), as schematically illustrated by FIGS. 4c-4e. Such RF radiation signal radiation patterns are also affected by the RFID reader transmit power level.

FIG. 4c schematically illustrates elevation view 410 and azimuth view 420 of an idealized isotropic radiation pattern of a monopole antenna equipped with a vertical conductive shield 4050. FIG. 4d schematically illustrates elevation view 410 and azimuth view 420 of an idealized isotropic radiation pattern of a monopole antenna equipped with a three-sided vertical conductive shield 4060, including elevation view 410 and azimuth view 420. FIG. 4e schematically illustrates an idealized isotropic radiation pattern of a monopole antenna equipped with a five-sided vertical conductive shield 4070, horizontal conductive shield 4080, and a monopole antenna.

Figure 6:
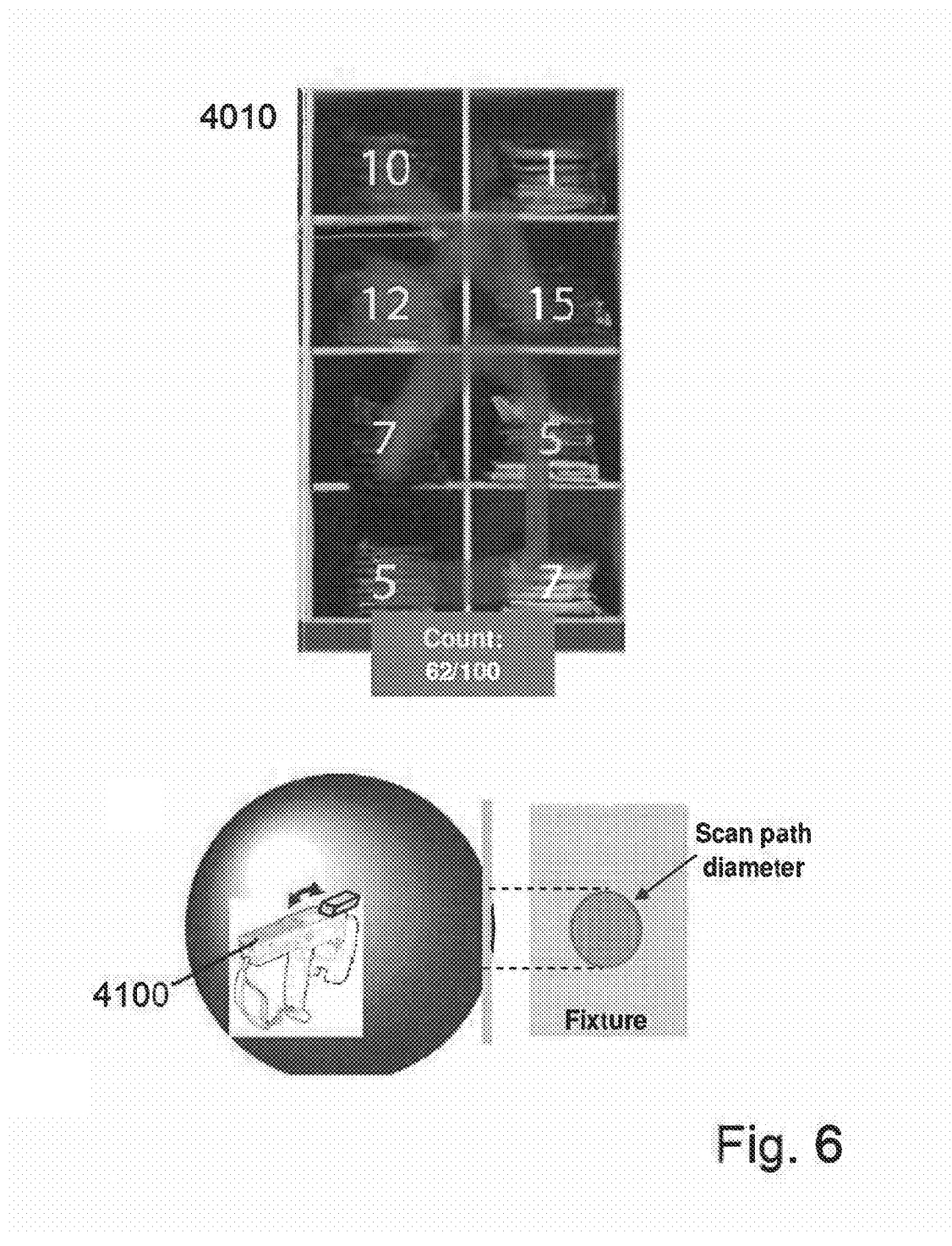
FIG. 6 schematically illustrates a use case scenario of varying transmit power level and measuring RFID tag response frequencies for determining inventory of items on a selected fixture.

In some embodiments, varying transmit power level and measuring RFID tag response frequencies can be used for distinguishing RFID tags located within a POS zone and exclusion zone, as described herein supra. In another use case scenario schematically illustrated by FIG. 6, varying transmit power level and measuring RFID tag response frequencies can be used for determining inventory on a selected fixture 4010. Portable RFID reading terminal 4100 can be configured to control the RF transmit power level of its RFID reading device and include as inventoried only RFID tags having the response frequencies within a defined frequency range, thus excluding RFID tags which are located within the RF transmit range of the RFID reading device, but outside of the fixture 4010. In another use case common to both POS and portable RFID terminals, the RFID reading device transmit power level may be varied to cause changes in the effective maximum range at which RFID tags may be read, resulting in one or more spatial zones.

Figure 7:
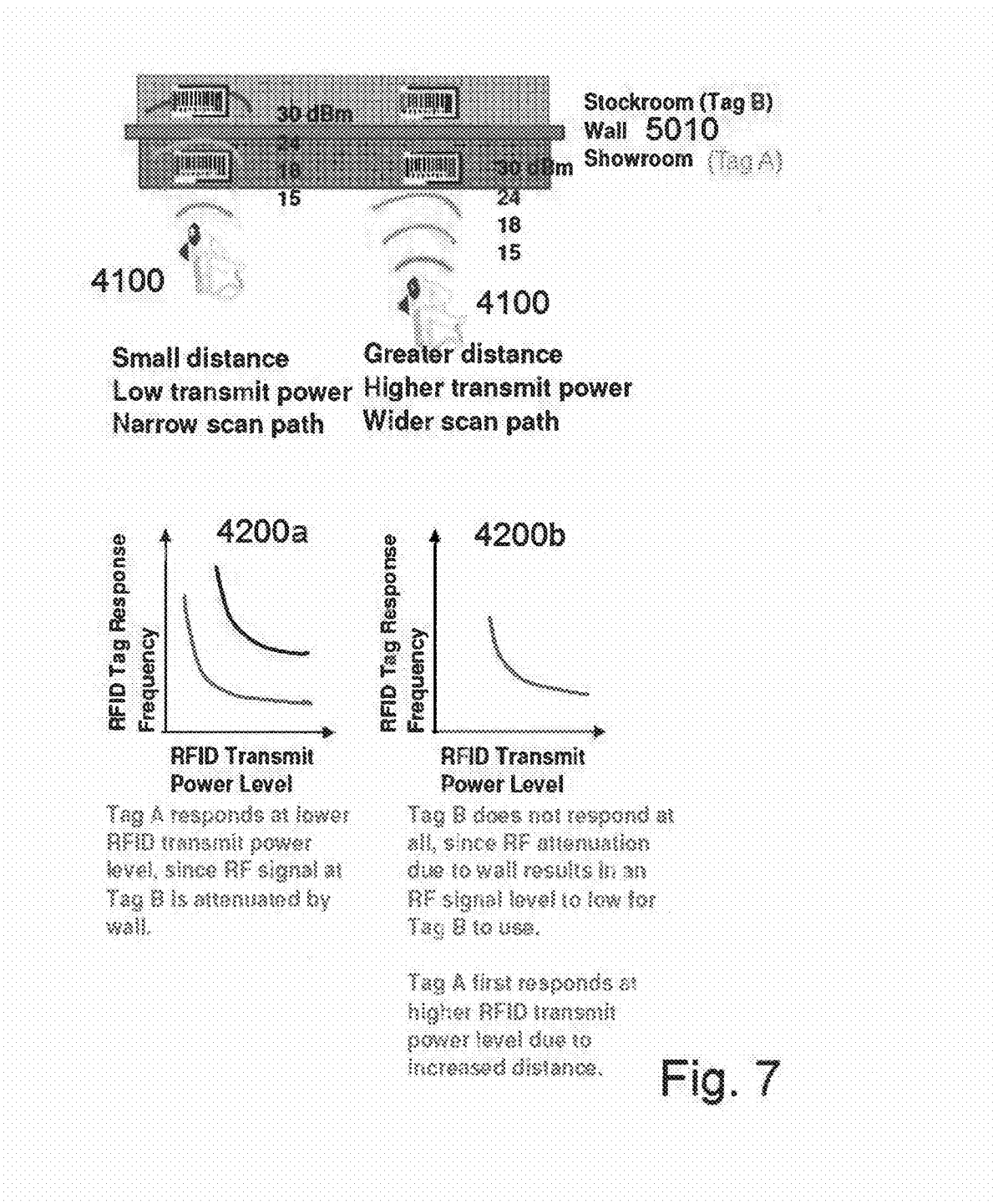
FIG. 7 schematically illustrates a portable RFID reading terminal configured to control the RF transmit power level of its RFID reading device.

As noted herein supra, in an anisotropic propagation environment, the RF signal strength can also be affected by attenuation of the RF signal as it passes through various RF energy absorbing objects (e.g., walls). In one illustrative embodiment, schematically shown in FIG. 7, portable RFID reading terminal 4100 can be configured to control the RF transmit power level of its RFID reading device and include as inventoried only RFID tags having the response frequencies within a defined frequency range, thus including RFID tags which are located within a spatial proximity of the fixture 4010 of FIG. 6, but excluding RFID tags behind an object having RF propagation characteristics different from those of air, such as wall 5010. As schematically illustrated by plot 4200a, RFID tag A responds at a lower RFID transmit power level, since an RF signal transmitted by RFID reader 4100 and reaching RFID tag B is attenuated by wall 5010. Plot 4200b schematically illustrates a situation when RFID reading device is moved further away from both RFID tags A and B. Due to the increased distance between the RFID reading device and each of the tags, RFID B tag does not respond at all, since the level of the RF signal attenuated by wall 5010 becomes too low for RFID tag B to convert and accumulate energy. RFID tag A responds at a greater distance due to the increased RFID reader transmit power level.

In a further aspect, RFID reading device 333 can be compliant with *EPC*™ *Class*-1 *Generation*-2 *UHF RFID Protocol for Communications at* 860 *MHz*-960 *MHz* by EPCglobal, commonly known as the "Gen 2" standard, which defines physical and logical requirements for a passive-backscatter, interrogator-talks-first (ITF) RFID system operating in the 860 MHz-960 MHz frequency range.

In one embodiment, system 100 can transmit information to a passive RFID tag by modulating an RF signal in the 860-960 MHz frequency range. An RFID tag can receive both information and operating energy from the RF signal transmitted by system 100. System 100 can receive information from the RFID tag by transmitting a continuous-wave (CW) RF signal to the RFID tag. The RFID tag can respond by modulating the reflection coefficient of its antenna, thus backscattering an information signal to system 100. In one embodiment, the RFID tag can modulate the reflection coefficient of its antenna only responsive to receiving an RFID signal from system 100.

In a further aspect, system 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

System 100 can be configured to receive information from an RFID tag by transmitting an unmodulated RF carrier and listening for a backscatter reply. RFID tags can transmit information by backscatter-modulating the amplitude and/or phase of the RFID carrier. RFID tags can encode the backscattered data using, e.g., FM0 baseband or Miller modulation of a subcarrier at the data rate. The encoding method to be employed by an RFID tag can be selected by system 100.

In another aspect, an RFID reading device can establish one or more sessions with one or more RFID tags. An RFID tag can support at least one session-dependent flag for every session. The session-dependent flag can have two states. An RFID tag can invert a session-dependent flag responsive to receiving a command from system 100. Tag resources other than session-dependent flags can be shared among sessions. In another aspect, an RFID tag can support a selected status flag indicating that the tag was selected by system 100.

Responsive to receiving an interrogation signal transmitted by system 100, an RFID tag can transmit a response signal back to system 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, an RFID reading device can implement *EPC™ Class-1 Generation-2 UHF RFID Protocol for Communications at 860 MHz-960 MHz* by EPCglobal. System 100 can interrogate RFID tags using the commands described herein infra.

Select command can be used by system 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by system 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, an RFID reading device can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, an RFID reading device can send a QueryAdjust command causing the tag to invert its Inventoried flag and to transition to Ready state.

Access command set can be used by system 100 for communicating with (reading from and writing to) a tag. An individual tag must be uniquely identified prior to access. Access command set includes the following commands:

ReqRn command can be used by system 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by system 100 to read tag's Reserved, EPC, TID and User memory;

Write command can be used by system 100 to write to tag's Reserved, EPC, TID and User memory;

Kill command can be used by system 100 to permanently disable a tag;

Lock command can be used by system 100 to lock passwords preventing subsequent read or write operations;

lock individual memory banks preventing subsequent write operations; permanently lock the lock status of passwords or memory banks;

Access command can be used by system 100 to cause a tag having a non-zero access password to transition from Open to Secured state.

A skilled artisan would appreciate the fact that other methods of interrogating RFID tags by RFID reading device 333 are within the scope of this disclosure.

In another aspect, system 100 can be incorporated in a data collection system. System 100 can establish a communication session with at least one external computer via a plurality of interconnected networks including local area networks, wide area networks, virtual private networks, and/or other types of networks. A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between system 100 and at least one external computer can comprise a series of requests and responses transmitted over one or more TCP connections. A skilled artisan would appreciate the fact that using various transport and application level protocols is within the scope and the spirit of the invention. At least one of the messages transmitted by system 100 can include decoded message data corresponding to an RFID label attached to an inventory item. For example, system 100 can transmit a request to the external computer to retrieve product information corresponding to a product identifier encoded by an RFID tag or a bar code label attached to a retail item.

A small sample of systems, methods, and apparata that are described herein is as follows:

A1. A system comprising: a processor; a memory; an RFID reading device including at least one radio frequency (RF) antenna; wherein said system is configured to read a first plurality of RFID tags attached to items disposed within a first spatial zone; wherein said system is further configured to read a second plurality of RFID tags attached to items disposed within a second spatial zone; and wherein said system is further configured to produce a list of identifiers of RFID tags which belong to said second plurality of RFID tags and do not belong to said first plurality of RFID tags. A2. The system of (A1), further comprising a decodable indicia reading device; wherein said system is further configured, responsive to successfully decoding decodable indicia attached to an item, to match said item to an RFID tag belonging to said list. A3. The system of (A1), further comprising a decodable indicia reading device; wherein said system is further configured, responsive to successfully decoding decodable indicia attached to an item, to match said item to an RFID tag belonging to said list; and wherein said system is further configured to transmit an identifier of said matched RFID tag to an external computer. A4. The system of (A1), further comprising a decodable indicia reading device; wherein said system is further configured, responsive to successfully decoding decodable indicia attached to an item, to match said item to an RFID tag belonging to said list; and wherein said system is further configured to modify a memory of said matched RFID tag. A5. The system of (A1), wherein said at least one RF antenna is provided by two or more RF antennas; wherein said system is configured to read said first plurality of RFID tags using a first RF antenna; and wherein said system is configured to read said second plurality of RFID tags using a second RF antenna. A6. The system of (A1), wherein said at least one RF antenna is equipped with at least one of: a ground plane spatially oriented according to a spatial location of at least one of said first spatial zone or said second spatial zone, or a conductive shield spatially oriented according to a spatial location of at least one of said first spatial zone or said second spatial zone. A7. The system of (A1), wherein said system is configured to associate RFID tags with one of said first spatial zone or said second spatial zone by performing at least one of: selecting an antenna from one or more antennas communicatively coupled to said RFID reading device, varying a transmit power of said RFID reading device and measuring RFID tag response rates at a given transmit power level. A8. The system of (A1), wherein said system is incorporated into one of: a portable device, a point-of-sale (POS) checkout register. A9. The system of (A1), wherein said first spatial zone and said second spatial zone intersect by at least one spatial point.

B1. A method, performed using one or more processors, comprising: reading, using at least one processor of said one or more processors, a first plurality of RFID tags attached to items disposed within a first spatial zone; reading, using at least one processor of said one or more processors, a second plurality of RFID tags attached to items disposed within a second spatial zone; and matching, using at least one processor of said one or more processors, said item to an RFID tag belonging to said second plurality of RFID tags but not to said first plurality of RFID tags. B2. The method of (B1), further comprising: decoding, using at least one processor of said one or more processors, optical decodable indicia attached to said item, preceding said step of matching. B3. The method of (B1), further comprising: transmitting, using at least one processor of said one or more processors, an identifier of said matched RFID tag to an external computer. B3. The method of (B1), further comprising: modifying, using at least one processor of said one or more processors, a memory of said matched RFID tag. B4. The method of (B1), wherein said step of reading said first plurality of RFID tags is performed using a first RF antenna; and wherein said step of reading said second plurality of RFID tags is performed using a second RF antenna.

C1. A method, performed using one or more processors, comprising: varying, using at least one processor of said one or more processors, a transmit power of an RFID reading device; measuring, using at least one processor of said one or more processors, response rates by a plurality of RFID tags at a given transmit power level; associating, using at least one processor of said one or more processors, each RFID tag of said plurality of RFID tags with one of: a first spatial zone or a second spatial zone; and matching, using at least one processor of said one or more processors, said item to an RFID tag belonging to said second plurality of RFID tags but not to said first plurality of RFID tags. C2. The method of (C1), further comprising: decoding, using at least one processor of said one or more processors, optical decodable indicia attached to said item, receding said step of matching. C3. The method of (C1), further comprising: transmitting, using at least one processor of said one or more processors, an identifier of said matched RFID tag to an external computer.

D1. A computer-readable storage medium comprising executable instructions capable of configuring one or more processors for: reading, using at least one processor of said one or more processors, a first plurality of RFID tags attached to items disposed within a first spatial zone; reading, using at least one processor of said one or more processors, a second plurality of RFID tags attached to items disposed within a second spatial zone; decoding, using at least one processor of said one or more processors, optical decodable indicia attached to an item; and matching, using at least one processor of said one or more processors, said item to an RFID tag belonging to said second plurality of RFID tags but not to said first plurality of RFID tags. D2. The computer-readable storage medium of (D1), in which the executable instructions are further capable of configuring one or more processors for: transmitting, using at least one processor of said one or more processors, an identifier of said matched RFID tag to an external computer. D3. The computer-readable storage medium of (D1), in which the executable instructions are further capable of configuring one or more processors for: modifying, using at least one processor of said one or more processors, a memory of said matched RFID tag. D4. The computer-readable storage medium of (D1), in which the executable instructions are further capable of configuring one or more processors so that: said step of reading said first plurality of RFID tags is performed using a first RF antenna; and wherein said step of reading said second plurality of RFID tags is performed using a second RF antenna.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:

1. A radio frequency identification ("RFID") reader of a point-of-sale (POS) system, comprising:
   a first radio frequency (RF) antenna configured to transmit power in a first spatial zone in order to read a first set of RFID tags disposed within the first spatial zone;
   a second RF antenna configured to transmit power in a second spatial zone in order to read the first set of RFID tags, at a second time wherein the second spatial zone is upstream the first spatial zone,
   wherein the first set of RFID tags are attached to items to be purchased at a point of sale location of an establishment, wherein the point of sale location comprises the first spatial zone and the second spatial zone, wherein a list of identifiers of cleared RFID tags is produced listing only RFID tags of the first set of RFID tags that indicate that they have been scanned, at a time between said first and second times, by a decodable indicia reading at the point of sale location, wherein the list is produced based on the first set of RFID tags being moved, from the first spatial zone to the second spatial zone based on the readings by the first and second RF antennas at the first and second times, to enable the POS system to identify read RFID tags of the first set of RFID tags that are not listed on the list and trigger an alert.

2. The RFID reader of claim 1,
   wherein, responsive to said decodable indicia reading device successfully decoding optical decodable indicia attached to an item of said items to be purchased being scanned, said item is matched to an RFID tag of the first set of RFID tags to produce an entry into said list.

3. The RFID reader of claim 1,
   wherein, responsive to said decodable indicia reading device successfully optical decoding decodable indicia attached to an item of said items to be purchased being scanned, said item is matched to an RFID tag of the first set of RFID tags to produce an entry into said list; and
   wherein an identifier of the list corresponding to said matched RFID tag is transmitted to an external computer.

4. The RFID reader of claim 1,
   wherein, responsive to said decodable indicia reading device successfully optical decoding decodable indicia attached to an item of said items to be purchased being scanned, said item is matched to an RFID tag of the first set of RFID tags to produce an entry into said cleared list; and
   wherein a memory of said matched RFID tag is modified.

5. The RFID reader of claim 1, wherein a second set of RFID tags is read using the second RF antenna at the first time, the second set of RFID tags being different from the first set of RFID tags at the first time.

6. The RFID reader of claim 1, wherein the first and second RF antennas are equipped with a respective conductive shield spatially oriented according to a respective spatial location of said first spatial zone or said second spatial zone.

7. The RFID reader of claim 1, wherein RFID tags with one of said first spatial zone or said second spatial zone are associated by performing at least one of:
   selecting an antenna from one or more RF antennas communicatively coupled to said RFID reader, varying a transmit power of said RFID reader and measuring RFID tag response rates at a given transmit power level.

8. The RFID reader of claim 1, wherein said RFID reader is configured to be incorporated into one of: a portable device, a point-of-sale (POS) checkout register.

9. The RFID reader of claim 1, wherein said first spatial zone and said second spatial zone intersect by at least one spatial point.

10. A method of a point-of-sale (POS) system, performed using one or more processors, comprising:
    transmitting first power, using a first radio frequency (RF) antenna of a radio frequency identification ("RFID") reader, within a first spatial zone to read a first set of RFID tags disposed at a first time in the first spatial zone;
    transmitting second power, using a second RF antenna of the RFID reader, within a second spatial zone to read the the-first set of RFID tags disposed upstream to the first spatial zone, at a second time;
    wherein the first set of RFID tags are attached to items to be purchased at a point of sale location of an establishment, wherein the point of sale location comprises the first spatial zone and the second spatial zone, wherein a list of identifiers of cleared RFID tags is produced listing only RFID tags of the first set of RFID tags that indicate that corresponding attached items to be purchased have been scanned, at a time between said first and second times, by a decodable indicia reading device, wherein the list is produced based on the first set of RFID tags being moved, from the first spatial zone to the second spatial zone based on the readings by the first and second RF antennas at the first and second times;

matching, using at least one processor, an RFID tag of said first set of RFID tags, between a time when the first set of RFID tags is read at the first spatial zone at the first time and when the RFID tag is read at the second spatial zone at the second time, responsive to said decodable indicia reading device successfully decoding optical decodable indicia attached to an item of said items to be scanned at the point of sale location; and adding the item to the list to produce an entry into said list only in response to the matching, to enable the POS system to identify read RFID tags of the first set of RFID tags that are not listed on the list and trigger an alert.

11. The method of claim 10, further comprising:
transmitting, using at least one processor of said one or more processors, an identifier of the list corresponding to said matched RFID tag to an external computer.

12. The method of claim 10, further comprising:
modifying, using at least one processor of said one or more processors, a memory of said matched RFID tag.

13. The method of claim 10, wherein the first and second RF antennas are equipped with a respective conductive shield spatially oriented according to a respective spatial location of said first spatial zone or said second spatial zone.

14. The method of claim 10, wherein RFID tags with one of said first spatial zone or said second spatial zone are associated by performing at least one of: selecting an antenna from one or more RF antennas communicatively coupled to said RFID reader, varying a transmit power of said RFID reader and measuring RFID tag response rates at a given transmit power level.

15. The method of claim 10, wherein said first spatial zone and said second spatial zone intersect by at least one spatial point.

16. A non-transitory computer-readable storage medium comprising executable instructions executed by one or more processors of a point-of-sale (POS) system for:
transmitting first power, using a first radio frequency (RF) antenna of a radio frequency identification ("RFID") reader, within a first spatial zone to read a first set of RFID tags disposed at a first time in the first spatial zone;

transmitting second power, using a second RF antenna of the RFID reader, within a second spatial zone to read the the-first set of RFID tags disposed upstream to the first spatial zone, at a second time;

wherein the first set of RFID tags are attached to items to be purchased at a point of sale location of an establishment, wherein the point of sale location comprises the first spatial zone and the second spatial zone, wherein a list of identifiers of cleared RFID tags is produced listing only RFID tags of the first set of RFID tags that indicate that corresponding attached items to be scanned at the point of sale location, at a time between said first and second times, by a decodable indicia reading device, wherein the list is produced based on the first set of RFID tags being moved, from the first spatial zone to the second spatial zone based on the readings by the first and second RF antennas at the first and second times;

matching, using at least one processor, an RFID tag of said first set of RFID tags, between a time when the first set of RFID tags is read at the first spatial zone at the first time and when the RFID tag is read at the second spatial zone at the second time, responsive to said decodable indicia reading device successfully decoding optical decodable indicia attached to an item of said items to be scanned at the point of sale location; and adding the item into said list only in response to the matching, to enable the POS system to identify read RFID tags of the first set of RFID tags that are not listed on the list and trigger a notification.

17. The computer-readable storage medium of claim 16, in which said executable instructions are for:
transmitting, using at least one processor of said one or more processors executing the executable instructions, an identifier of the list corresponding to said first RFID tag to an external computer once the first RFID tag is matched.

18. The computer-readable storage medium of claim 16, in which said executable instructions are for:
modifying, using at least one processor of said one or more processors executing the executable instructions, a memory of said first RFID tag once the first RFID tag is matched.

19. The computer-readable storage medium of claim 16, wherein said first spatial zone and said second spatial zone intersect by at least one spatial point.

* * * * *